US008937869B2

(12) United States Patent
Akahane et al.

(10) Patent No.: US 8,937,869 B2
(45) Date of Patent: *Jan. 20, 2015

(54) COMMUNICATION DEVICE, COMMUNICATION SYSTEM, AND COMMUNICATION FAULT DETECTION METHOD

(75) Inventors: Shinichi Akahane, Hachioji (JP); Teruo Kaganoi, Funabashi (JP); Tomohiko Kohno, Yokohama (JP); Kazuo Sugai, Hadano (JP)

(73) Assignee: ALAXALA Networks Corporation, Kanagawa (JP)

( * ) Notice: Subject to any disclaimer, the term of this patent is extended or adjusted under 35 U.S.C. 154(b) by 655 days.

This patent is subject to a terminal disclaimer.

(21) Appl. No.: 13/270,305

(22) Filed: Oct. 11, 2011

(65) Prior Publication Data

US 2012/0026894 A1 Feb. 2, 2012

Related U.S. Application Data

(63) Continuation of application No. 12/177,938, filed on Jul. 23, 2008, now Pat. No. 8,064,353.

(30) Foreign Application Priority Data

Nov. 29, 2007 (JP) ................................ 2007-308224

(51) Int. Cl.
*H04J 3/14* (2006.01)
*H04L 1/22* (2006.01)
*H04L 1/24* (2006.01)

(52) U.S. Cl.
CPC ... *H04L 1/22* (2013.01); *H04L 1/24* (2013.01)
USPC ........................................................ 370/242

(58) Field of Classification Search
None
See application file for complete search history.

(56) References Cited

U.S. PATENT DOCUMENTS 6,707,820 B1 3/2004 Arndt et al.
8,064,353 B2 * 11/2011 Akahane et al. ............... 370/242

(Continued)

FOREIGN PATENT DOCUMENTS

JP 2003324463 11/2003
JP 2006245849 9/2006
JP 2007189476 7/2007

OTHER PUBLICATIONS

M. Foshiano, Cisco Systems, Apr. 2007, "Cisco Systems UniDirectional Link Detection (UDLD) Protocol draft-foschiano-udld-03.txt".

*Primary Examiner* — Kevin C Harper
(74) *Attorney, Agent, or Firm* — Brundidge & Stanger, P.C.

(57) ABSTRACT

The communication device has a frame transfer unit that executes frame transfer via the first communication link and the second communication link, a link confirmation frame sending unit, and a return link confirmation frame monitoring unit. The link confirmation frame sending unit causes the frame transfer processing unit to send a link confirmation frame for use in confirming a normal link status via the first communication link from the communication device to the counterpart communication device. The return link confirmation frame monitoring unit performs fault detection of the first and second communication links by monitoring a return link confirmation frame which is to be returned from the counterpart communication device to the communication device via the second communication link when the counterpart communication device receives the link confirmation frame via the first communication link.

14 Claims, 24 Drawing Sheets

(56) References Cited

U.S. PATENT DOCUMENTS

| | | |
|---|---|---|
| 2004/0228358 A1 | 11/2004 | Beshai et al. |
| 2005/0249123 A1 | 11/2005 | Finn |
| 2009/0141641 A1 | 6/2009 | Akahane et al. |

* cited by examiner

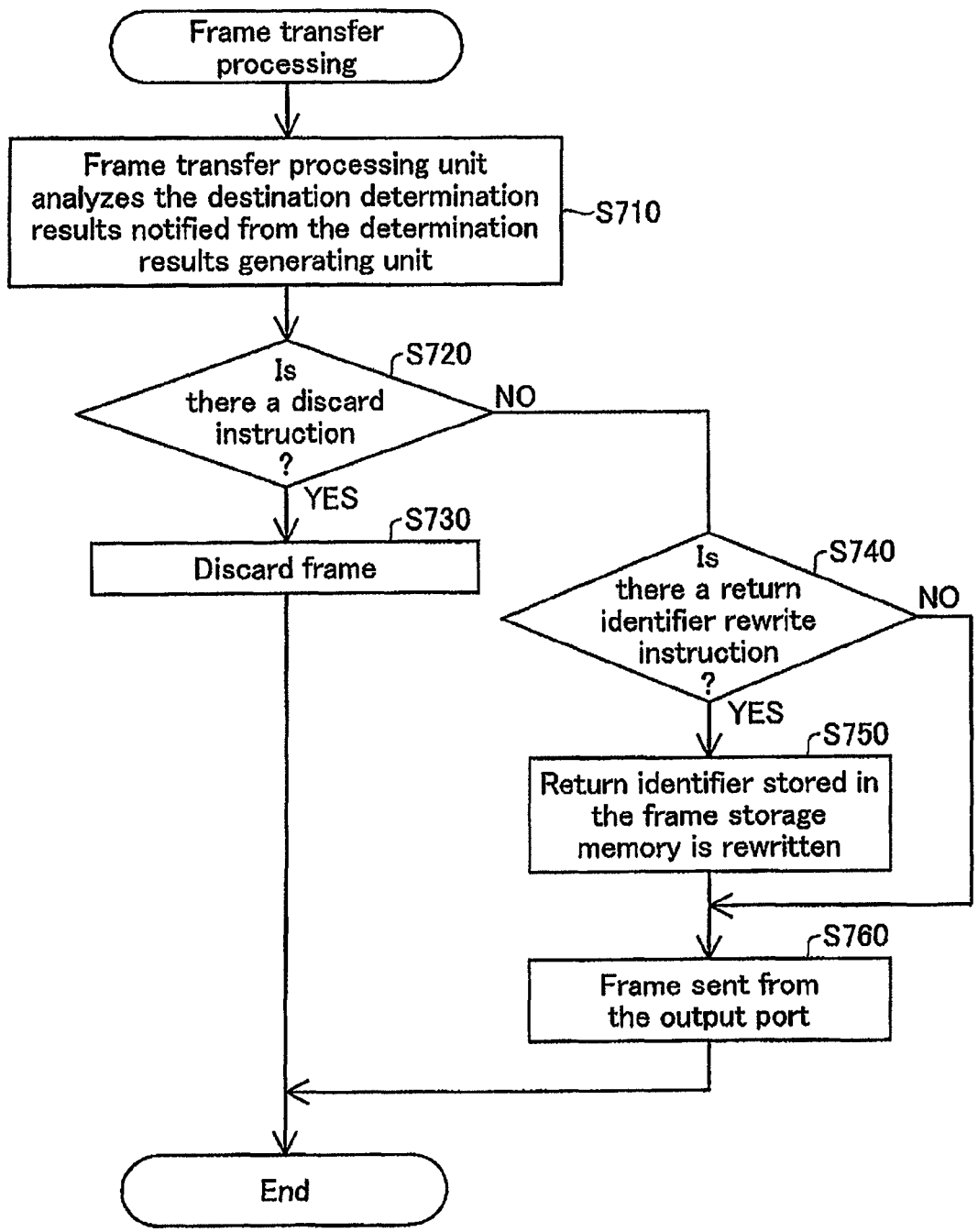

Fig.10

LHC (LHCB) Frame Format

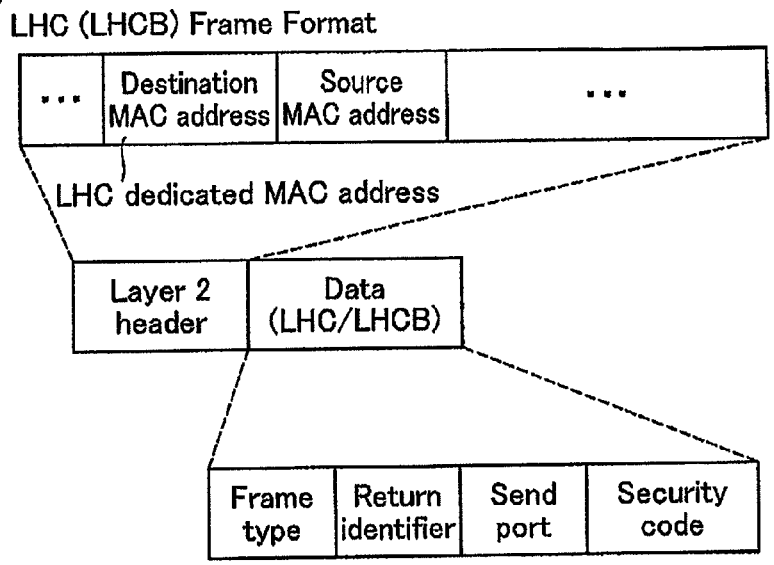

Fig.11

Port Status Management Table (When Normal)

| Port | Logical State | Monitoring Status | Monitoring Time Limit | Monitoring Timer |
|------|---------------|-------------------|----------------------|------------------|
| P11  | FWD           | Fault monitoring  | 10ms                 | 1ms              |
| P12  | FWD           | Fault monitoring  | 50ms                 | 1ms              |
| ⋮    | ⋮             | ⋮                 | ⋮                    | ⋮                |
| P1n  | FWD           | Fault monitoring  | 100s                 | 2ms              |

Fig.12

Port Status Management Table (When Fault Occurs)

| Port | Logical State | Monitoring Status | Monitoring Time Limit | Monitoring Timer |
|------|---------------|-------------------|----------------------|------------------|
| P21  | FWD → BLK     | Restoration monitoring | 10ms            | 10ms             |
| P22  | FWD           | Fault monitoring  | 50ms                 | 1ms              |
| ⋮    | ⋮             | ⋮                 | ⋮                    | ⋮                |
| P2n  | FWD           | Fault monitoring  | 100s                 | 2ms              |

Fig.24A

SW1A Port Status Management Table (When Normal)

| Port | Logical State | Monitoring Status | Monitoring Time Limit | Monitoring Timer |
|------|---------------|-------------------|-----------------------|------------------|
| P11  | FWD           | RG monitoring     | 10ms                  | 1ms              |
| P12  | FWD           | RG monitoring     | 50ms                  | 1ms              |
| ⋮    | ⋮             | ⋮                 | ⋮                     | ⋮                |
| P1n  | FWD           | RG monitoring     | 100s                  | 2ms              |

Fig.24B

SW2A Port Status Management Table (When Normal)

| Port | Logical State | Monitoring Status | Monitoring Time Limit | Monitoring Timer |
|------|---------------|-------------------|-----------------------|------------------|
| P21  | FWD           | RG monitoring     | 10ms                  | 1ms              |
| P22  | FWD           | RG monitoring     | 50ms                  | 1ms              |
| ⋮    | ⋮             | ⋮                 | ⋮                     | ⋮                |
| P2n  | FWD           | RG monitoring     | 100s                  | 2ms              |

Fig.25A

SW1A Port Status Management Table (When There is a Fault)

| Port | Logical State | Monitoring Status | Monitoring Time Limit | Monitoring Timer |
|---|---|---|---|---|
| P11 | FWD → BLK | RG monitoring | 10ms | 10ms |
| P12 | FWD | RG monitoring | 50ms | 1ms |
| ⋮ | ⋮ | ⋮ | ⋮ | ⋮ |
| P1n | FWD | RG monitoring | 100s | 2ms |

Fig.25B

SW2A Port Status Management Table (When There is a Fault)

| Port | Logical State | Monitoring Status | Monitoring Time Limit | Monitoring Timer |
|---|---|---|---|---|
| P21 | FWD → BLK | RG/RF not returned | 10ms | 10ms |
| P22 | FWD | RG monitoring | 50ms | 1ms |
| ⋮ | ⋮ | ⋮ | ⋮ | ⋮ |
| P2n | FWD | RG monitoring | 100s | 2ms |

COMMUNICATION DEVICE, COMMUNICATION SYSTEM, AND COMMUNICATION FAULT DETECTION METHOD

CROSS-REFERENCE TO RELATED APPLICATIONS

The present application is a continuation of application Ser. No. 12/177,938, filed Jul. 23, 2008 now U.S. Pat. No. 8,064,353; which claims the priority based on Japanese Patent Application No. 2007-308224 filed on Nov. 29, 2007, the disclosure of which is hereby incorporated by reference in its entirety.

BACKGROUND OF THE INVENTION

1. Field of the Invention

The present invention relates to a communication device, and particularly to a communication device for performing fault detection on a network.

2. Description of the Related Art

The physical line of one port connecting two communication devices is constituted by two lines, which serve a bidirectional link between the two communication devices. There are cases when a fault occurs with one link of the two links (called "unidirectional link fault"). With the unidirectional link fault, one of the communication devices is possible to send messages but not to receive, while the other of the communication devices is possible to receive messages but not to send, whereby various types of faults such as looping occur on the network. This kind of fault can be resolved by detecting the unidirectional link fault and closing the port for which the fault was detected.

A method for detecting the aforementioned unidirectional link fault, a UDLD (Uni-Directional Link Detection) protocol has been proposed.
(See, for example, Cisco System UniDirectional Link (UDLD) Protocol. <URL:http://www.ietf.org/internet-drafts/draft-foshciano-udld-03.txt/>.)

With the unidirectional link fault detection using this UDLD, first and second communication devices are sending and receiving link normal confirmation frames, and the first device judges the state of the link from the first communication device toward the second communication device based on the link normal notification frame sent from the second device to the first device.

However, with the unidirectional link fault detection using the aforementioned UDLD, typically, the fault detection time is long, and the time required from occurrence of a fault for closing the fault occurring port is considerably long, so there is the problem that the fault status is maintained for a long time. Because of this, there is a desire to shorten the unidirectional link fault detection time.

SUMMARY OF THE INVENTION

An object of the present invention is to shorten the unidirectional link fault detection time.

According to an aspect of the present invention, there is provided a communication device for detecting faults in at least either one of a first communication link and a second communication link constituting a set of physical lines connecting a first port of the communication device and a second port of a counterpart communication device. The first communication link is used for frame transfer from the communication device to the counterpart communication device, and the second communication link is used for frame transfer from the counterpart communication device to the communication device. The communication device comprises a frame transfer unit that executes frame transfer via the first communication link and the second communication link, a link confirmation frame sending unit, and a return link confirmation frame monitoring unit. The link confirmation frame sending unit causes the frame transfer processing unit to send a link confirmation frame for use in confirming a normal link status via the first communication link from the communication device to the counterpart communication device. The return link confirmation frame monitoring unit performs fault detection of the first and second communication links by monitoring a return link confirmation frame which is to be returned from the counterpart communication device to the communication device via the second communication link when the counterpart communication device receives the link confirmation frame via the first communication link.

With this communication device, it is possible to perform fault detection of the first communication link or the second communication link by monitoring the return link confirmation frame which is to be returned via the second communication link from the counterpart communication device upon receiving the link confirmation frame.

Here, the return link confirmation frame may be the link confirmation frame itself which is returned from the counterpart communication device upon receiving the link confirmation frame. Thus the conventional software processing such as that of the UDLD protocol described with the prior art is not necessary, and it is possible to shorten the link fault detection time.

When the return link confirmation frame is not received, the return link confirmation frame monitoring unit sets the first port at a logical state in which frame transmission is not possible. When the return link confirmation frame is received, on the other hand, the return link confirmation frame monitoring unit sets the first port at another state in which frame transmission is possible.

With this arrangement, it is possible to block the frame transmission via the faulty link.

According to another aspect of the present invention, there is provided a communication device that comprises a frame transfer unit, a status notification frame monitoring unit, and a status notification frame sending unit. The frame transfer unit executes frame transfer via the first communication link and the second communication link. The status notification frame monitoring unit that performs fault detection of at least the first communication link by monitoring a first status notification frame indicating a status of the first communication link which is to be sent from the counterpart communication device to the communication device via the second communication link. The status notification frame sending unit causes the frame transfer unit to send a second status notification frame indicating a status of the second communication link to the counterpart communication device via the first communication link, based on the monitoring of the first status notification frame by the status notification frame monitoring unit.

With this communication device, it is possible to perform fault detection of at least the first communication link by monitoring the first status notification frame which is to be sent via the second communication link from the counterpart communication device to the communication device of interest.

Here, the status notification frame is simply a notification frame indicating whether the link is normal or faulty. Thus the conventional software processing such as that of the UDLD protocol described with the prior art is not necessary, and it is possible to shorten the link fault detection time.

The status notification frame monitoring unit may: (1) judge that there is a fault at least with the second communication link when the status notification frame is not received, and sets the first port at a logical state in which frame transmission is not possible; (2) judge that there is a fault in the first communication link when the first status notification frame indicates that the first communication link is faulty, and sets the first port at a logical state in which frame transmission is not possible; and (3) judge that the first communication link is normal when the first status notification frame indicates that the first communication link is normal, and sets the first port at a logical state in which frame transmission is possible.

With this arrangement, it is possible to block the frame transmission via the faulty link.

Note that the present invention is not limited to the communication devices noted above, and it is possible to realize in various implementations including a communication system or a communication fault detection method or the like.

BRIEF DESCRIPTION OF THE DRAWINGS

FIG. 9 shows the received frame process flow;
FIG. 10 shows the LHC frame and the LHCB frame format;
FIG. 11 shows an example of the port status management table for the status when a link fault has not occurred;
FIG. 12 shows an example of the port status management table for the status when a link fault has occurred.

FIGS. 24A and 24B show an example of the port status management tables for the status when a link fault has not occurred;

FIGS. 25A and 25B show an example of the port status management tables for the status when a link fault has occurred;

DESCRIPTION OF THE PREFERRED EMBODIMENT

Figure 1:
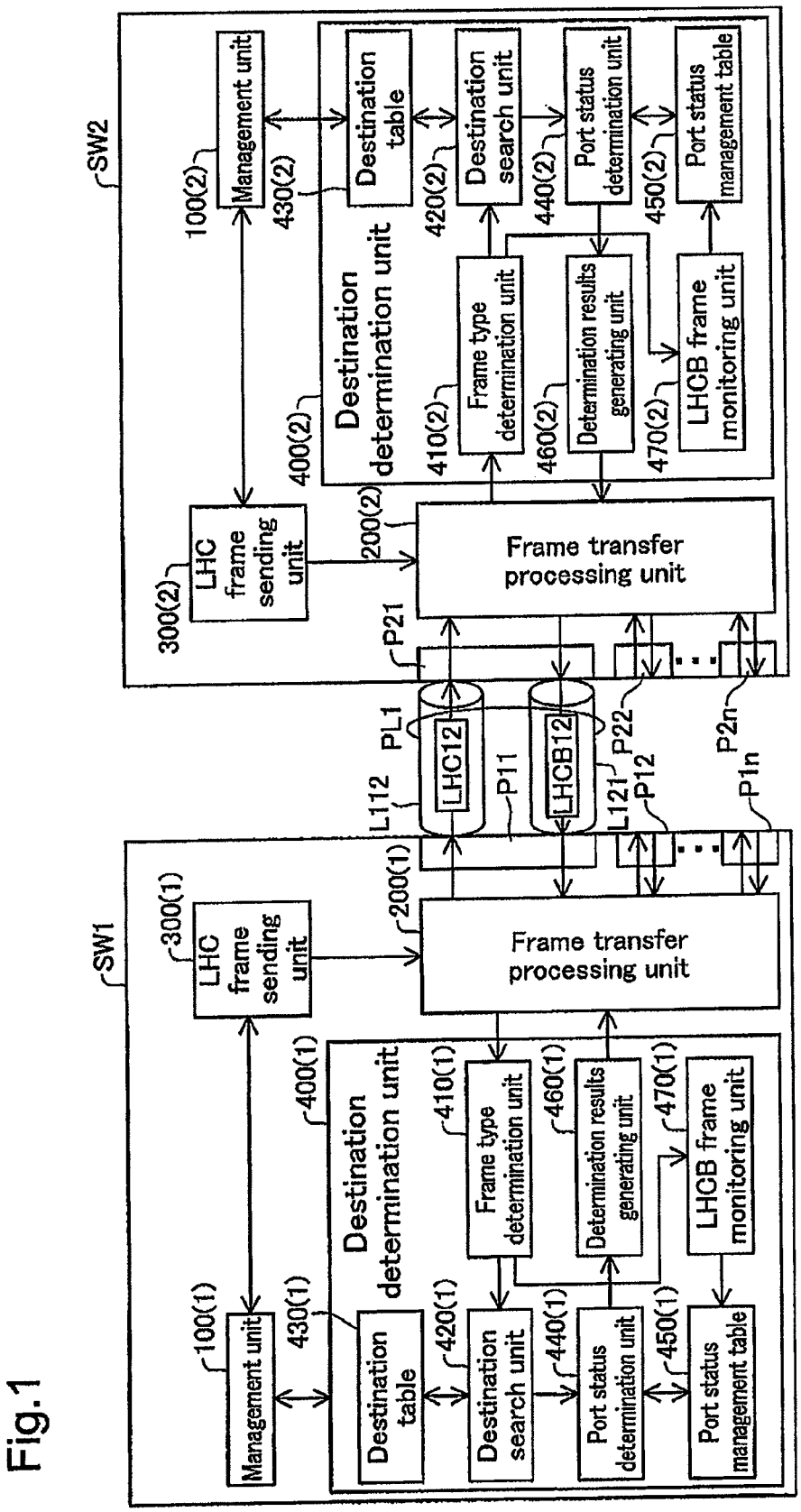
FIG. 1 is a block diagram for explaining the unidirectional link fault detection executed with the communication device as the first embodiment.
Figure 2:
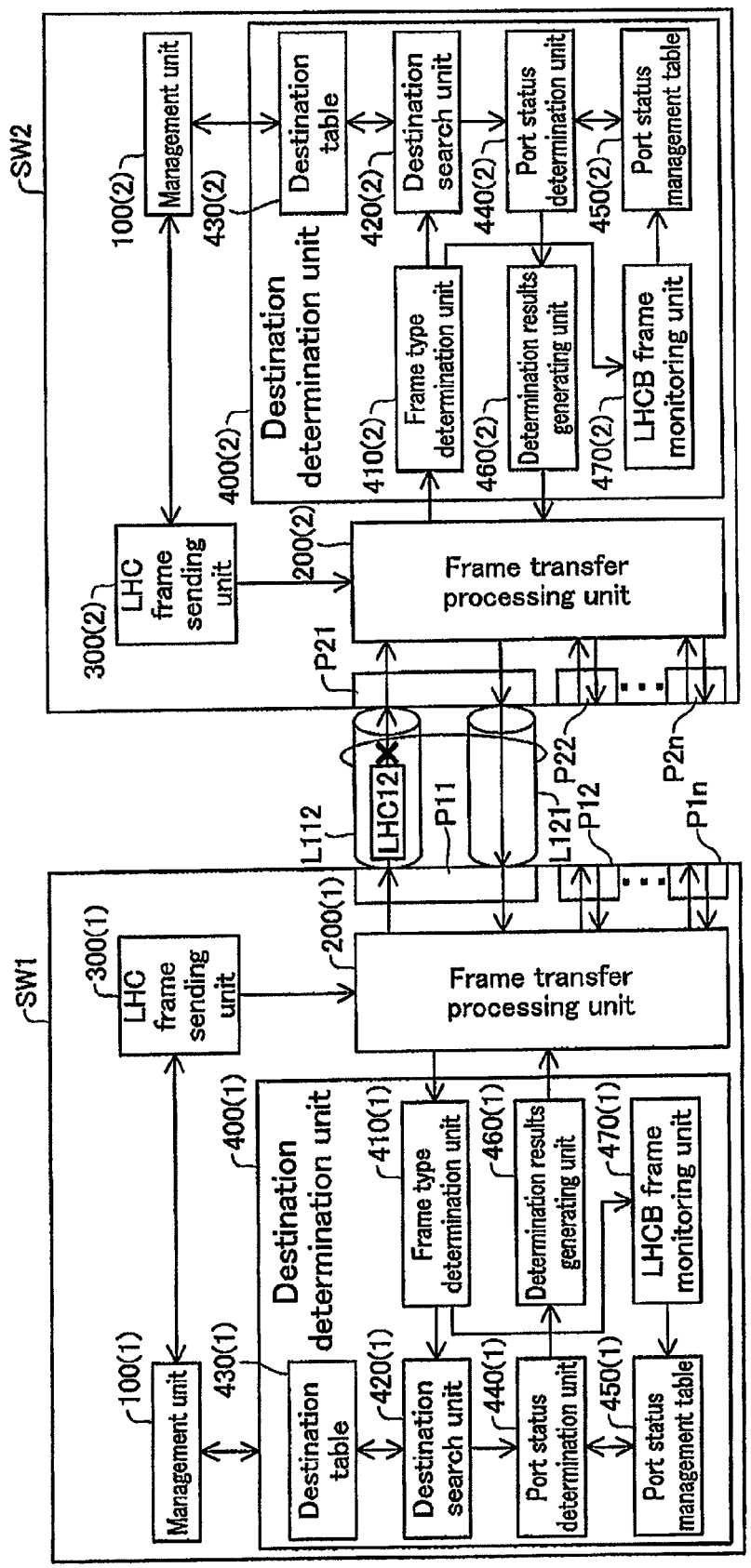
FIG. 2 is a block diagram for explaining the unidirectional link fault detection executed with the communication device as the first embodiment.

Various embodiments of the present invention are described in the following sequence.
  A. First Embodiment
  B. Second Embodiment
  C. Variation Examples
A. First Embodiment FIG. 1 and FIG. 2 are block diagrams for describing the unidirectional link fault detection executed with the communication device as the first embodiment. FIG. 1 shows a case of a normal state when a fault has not occurred, and FIG. 2 shows a case of a fault occurrence state.

A switch SW1, which is the first communication device, has a plurality of ports P11 to P1$n$ where n is an integer of 2 or greater. The first port P11 of the first switch SW1 is connected via the physical line PL1 to the first port P21 of the plurality of ports P21 to P2$n$ provided in a switch SW2, which is the second communication device. The physical line PL1 is constituted by two links (bidirectional link), including a first link L112 on which are sent Ethernet® frames (hereafter simply called "frames") from the first switch SW1 toward the second switch SW2, and a second link L121 on which frames are sent from the second switch SW2 to the first switch SW1. Note that to make the description easier, we will omit communication devices connected to the other ports of the first switch SW1 and the second switch SW2. Also, the first switch SW1 will be described in terms of unidirectional link fault detection for detecting faults of the two links L112 and L121 of the physical line PL1. Note that hereafter, of the two switches SW1 and SW2, the switch as the main unit communication device is sometimes called the "device of interest," and the switch as the communication device opposite the device of interest is sometimes called the "counterpart device."

We will give a brief description of the fault detection of the two links L112 and L121 of the physical line PL1 by the first switch SW1.

First, as shown in FIG. 1, a link normal check (LHC) frame (LHC12) for detecting link faults is sent via the first communication link L112 from the first switch SW1 toward the second switch SW2. The second switch SW2 which receives the LHC frame returns a LHC frame via the second communication link L121 toward the first switch SW1. Note that hereafter, this returned LHC frame is called the LHCB frame (LHCB12). Then, the first switch SW1 which receives the LHCB frame judges that the two links L112 and L121 of the physical line PL1 connected via the port P11 are normal.

Meanwhile, as shown in FIG. 2, when a fault occurs on the first communication link L112, the second switch SW2 cannot receive the LHC frame sent from the first switch SW1 toward the second switch SW2, so the LHCB frame cannot be returned toward the first switch SW1. At this time, the first switch SW1 cannot receive the LHCB frame corresponding to the sent LHC frame, and it is judged that a fault has occurred at least at one of the first communication link L112 and the second communication link L121 of the physical line PL1 connected via the port P11. Then, the first switch SW1 is set to a state for which sending and receiving of frames is not possible via the port 1.

To execute the aforementioned fault detection, the first switch SW1 and the second switch SW2 are constituted by the functional blocks described hereafter.

Each of the first switch SW1 and the second switch SW2 has a management unit 100, a frame transfer processing unit 200, an LHC frame sending unit 300, and a destination determination unit 400. The destination determination unit 400 has a frame type determination unit 410, a destination search unit 420, a destination table 430, a port status determination unit 440, a port status management table 450, a determination result generating unit 460, and an LHCB frame monitoring unit 470.

Note that to distinguish between the first switch SW1 block and the second switch SW2 blocks, (1) is added to the reference numerals of the first switch SW1 block, and (2) is added to the reference numerals of the second switch SW2 blocks.

The fault detection of the two links L112 and L121 of the physical line PL1 between the first switch SW1 and the second switch SW2 is executed by the functional blocks of the first switch SW1 and the second switch SW2 through a link fault monitoring start process, a received frame process, and an LHCB frame monitoring process described hereafter.

Figure 3:
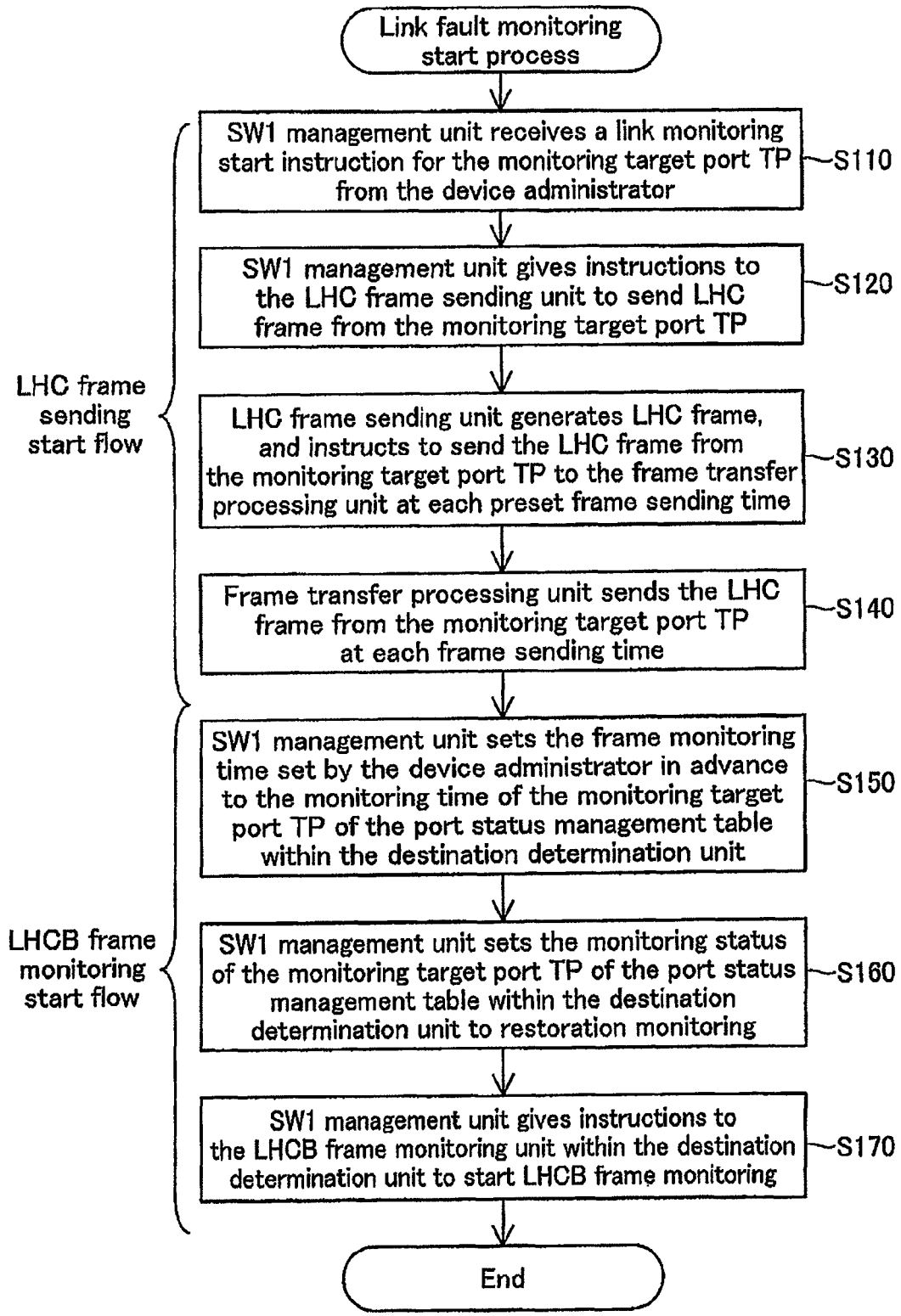
FIG. 3 shows the process flow for starting link fault monitoring.

FIG. 3 shows the process flow for the link fault monitoring start process. The first switch SW1, which is to perform the link fault monitoring, executes the link fault monitoring start process shown in FIG. 3 at its device startup.

First, the LHC frame send start process of steps S110 to S140 is performed, and next, the LHCB frame monitoring start process of steps S150 to S170 is performed.

In the LHC frame send start process, the first switch SW1 management unit 100(1) receives a link monitoring start instruction for the monitoring target port TP from the device administrator person at step S110, and gives instructions to the LHC frame sending unit 300(1) to send an LHC frame from the monitoring target port TP at step S120. This instruction is performed by connecting a terminal (not illustrated) to the first switch SW1, and having the device administrator person input the instruction from this terminal to the first switch SW1.

Then, the LHC frame sending unit 300(1) generates an LHC frame, and instructs the frame transfer processing unit 200(1) at step S130 to send the LHC frame from the monitoring target port TP at each preset frame sending time. The frame transfer processing unit 200(1) sends the LHC frame from the monitoring target port TP at each frame sending time at step S140. Thus the LHC frame send start process is completed. Note that one or more of the plurality of ports P11 to P1n are set as the monitoring target port TP.

In the LHCB frame monitoring start process, the switch SW1 management unit 100(1) sets the frame monitoring time limit, which has been set by the device administrator person in advance, to the monitoring time limit of the monitoring target port TP in the port status management table 450(1) of the destination determination unit 400(1) at step S150. This setting is performed by connecting the first switch SW1 to a terminal (not illustrated), and by having the device administrator person input the frame monitoring time limit to the first switch SW1 from this terminal. Also, the management unit 100(1) sets the monitoring status of the monitoring target port TP of the port status management table 450 within the destination determination unit 400(1) to "restoration monitoring" at step S160. This monitoring status will be described later.

The management unit 100(1) gives instructions to the LHCB frame monitoring unit 470(1) within the destination determination unit 400(1) to start LHCB frame monitoring at step S170. Thus the LHCB frame monitoring start process is completed. That the LHCB frame monitoring process, which is to be executed by the LHCB frame monitoring unit 470(1) that receives the instruction to start the LHCB frame monitoring, is described later.

FIG. 4 to FIG. 9 are explanatory drawings showing the process flow of the received frame processing. This received frame processing is started upon arrival of frames to any of the respective ports of either the first or second switch SW1 or SW2. In light of this, with this description, to distinguish between the first switch SW1 and the second switch SW2, we will describe this without adding (1) and (2) to the reference numerals. It is assumed here that the link fault detection is executed by the first switch SW1, and that the first switch SW1 sends an LHC frame and the second switch SW2 returns an LHCB frame upon receiving the LHC frame.

Figure 4:
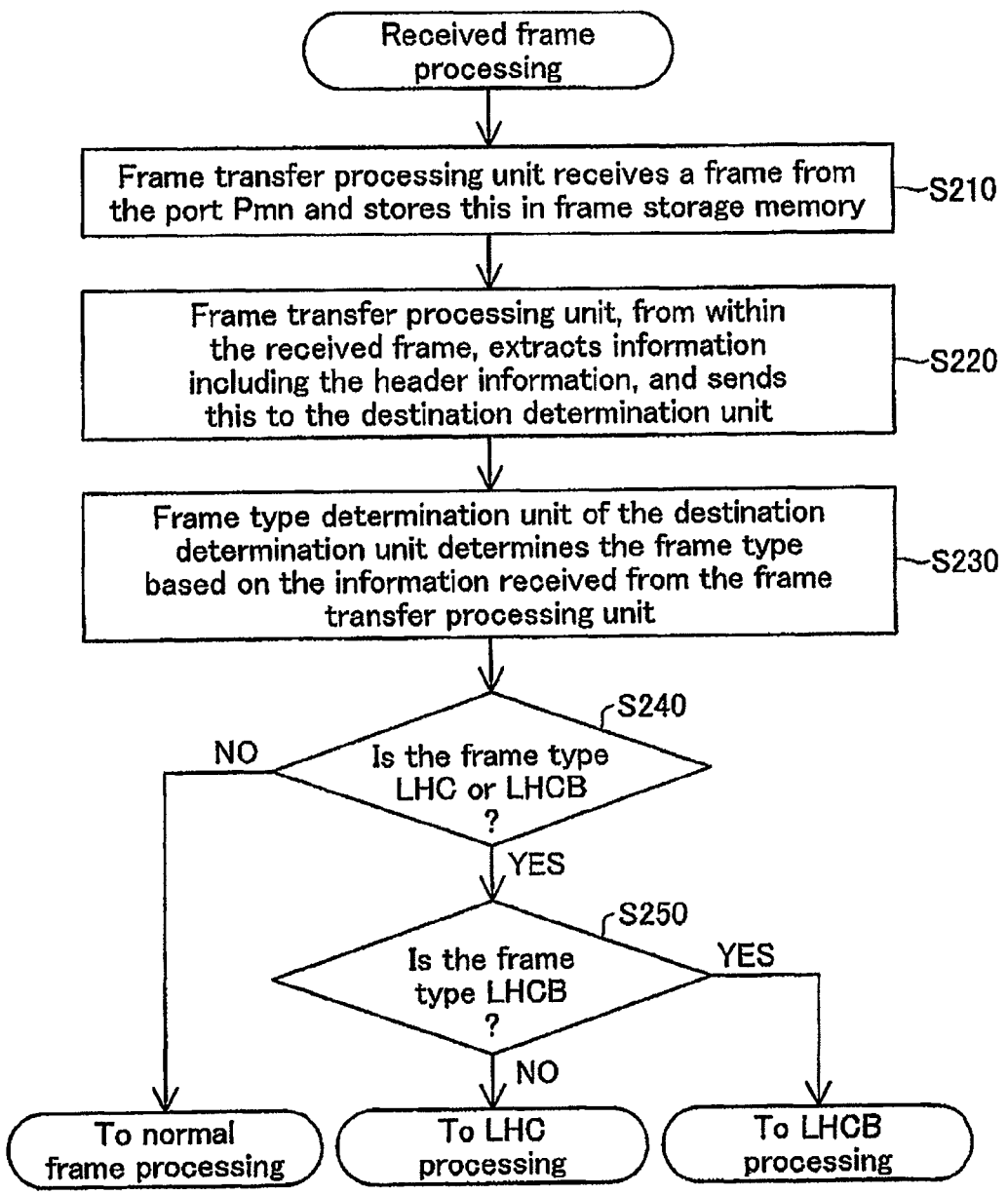
FIG. 4 shows the received frame process flow.

In the process of FIG. 4, the frame transfer processing unit 200 receives a frame from the port Pmn (with the first switch SW1 this is one of P11 to P1n, and with the second switch SW2 this is one of P21 to P2n), and stores the frame in a frame storage memory (not illustrated) at step S210. Then, the frame transfer processing unit 200 extracts, from the received frame, header information and fault detection information for use in the fault detection, and sends the information to the destination determination unit 400 at step S220. The fault detection information includes a return identifier described later, and the header information includes a destination MAC address, a source MAC address, or a VLAN-ID.

Note that handling of the LHC frames and the LHCB frames with priority before other normal frames is desirable for high speed link fault detection. In light of this, the frame transfer processing unit 200 determines whether or not the received frame is an LHC frame or an LHCB frame, and when it is an LHC frame or an LHCB frame, it is preferable to store this frame in the frame storage memory with priority. The determination of the frame type may be executed through the frame type determination process described below.

The frame type determination unit 410 of the destination determination unit 400 determines the frame type based on the header information and the fault detection information received from the frame transfer processing unit 200 at step S230. When the determined frame type is a normal frame (normal Ethernet frame), the process advances to the normal frame processing shown in FIG. 5. When the determined frame type is an LHC frame, the process advances to the LHC frame processing shown in FIG. 6, and when the determined frame type is the LHCB frame, the process advances to the LHCB frame processing shown in FIG. 7.

FIG. 10 shows the LHC frame and LHCB frame format. The LHC frame and LHCB frame, as is the case with normal Ethernet frames, includes a layer 2 header field and a data field (LHC data field). However, in the case of the LHC frame and the LHCB frame, inserted in the destination MAC address field is a specific MAC address (LHC dedicated MAC address) allocated exclusively for the LHC frame. Therefore, it is possible to distinguish the LHC frame and LHCB frame from the normal frames based on the destination MAC address. Also, a return identifier field is provided in the LHC data field, and it is possible to distinguish between the LHC frame and the LHCB frame based on this return identifier field.

Figure 5:
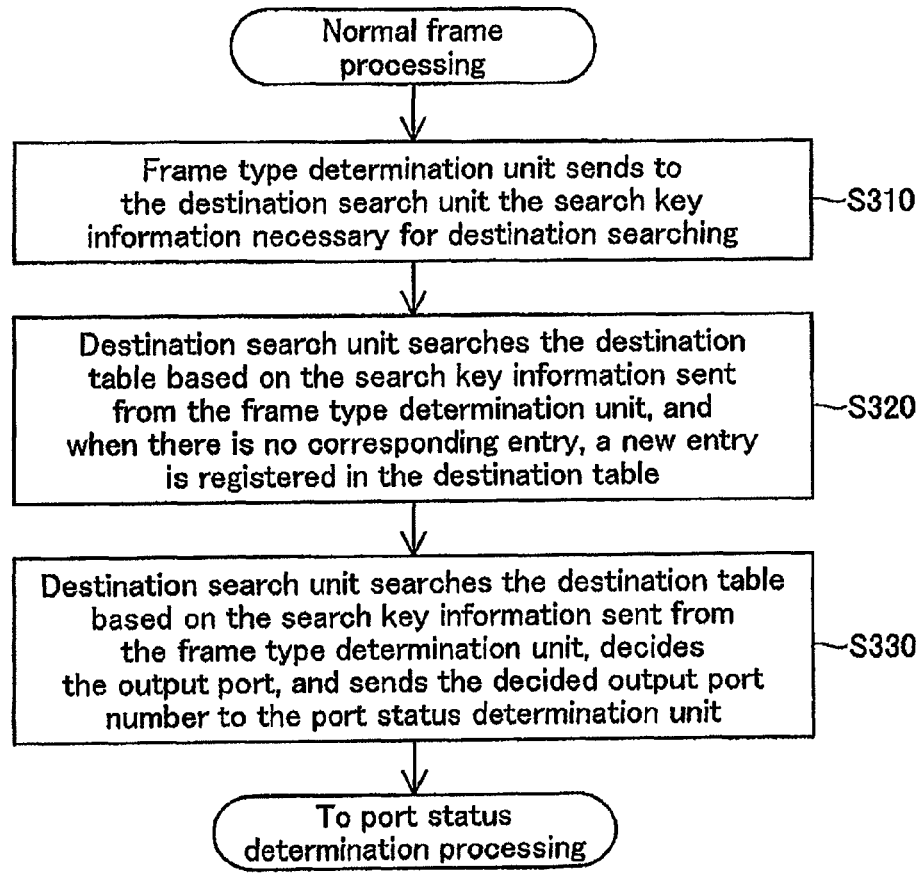
FIG. 5 shows the received frame process flow.

FIG. 5 shows a process of handling normal frames. The frame type determination unit 410 sends to the destination search unit 420 the search key information necessary for destination searching such as the destination MAC address, and the VLAN-ID at step S310.

The destination search unit 420 searches the destination table 430 based on the search key information sent from the frame type determination unit 410, and when there is no corresponding entry, a new entry is registered in the destination table 430 at step S320. Note that this process is typically called the "learning process." Next, the destination search unit 420 searches the destination table 430 based on the search key information sent from the frame type determination unit 410, decides the output port for outputting the received frame, and sends the decided output port number to the port status determination unit 440 at step S330.

Figure 8:
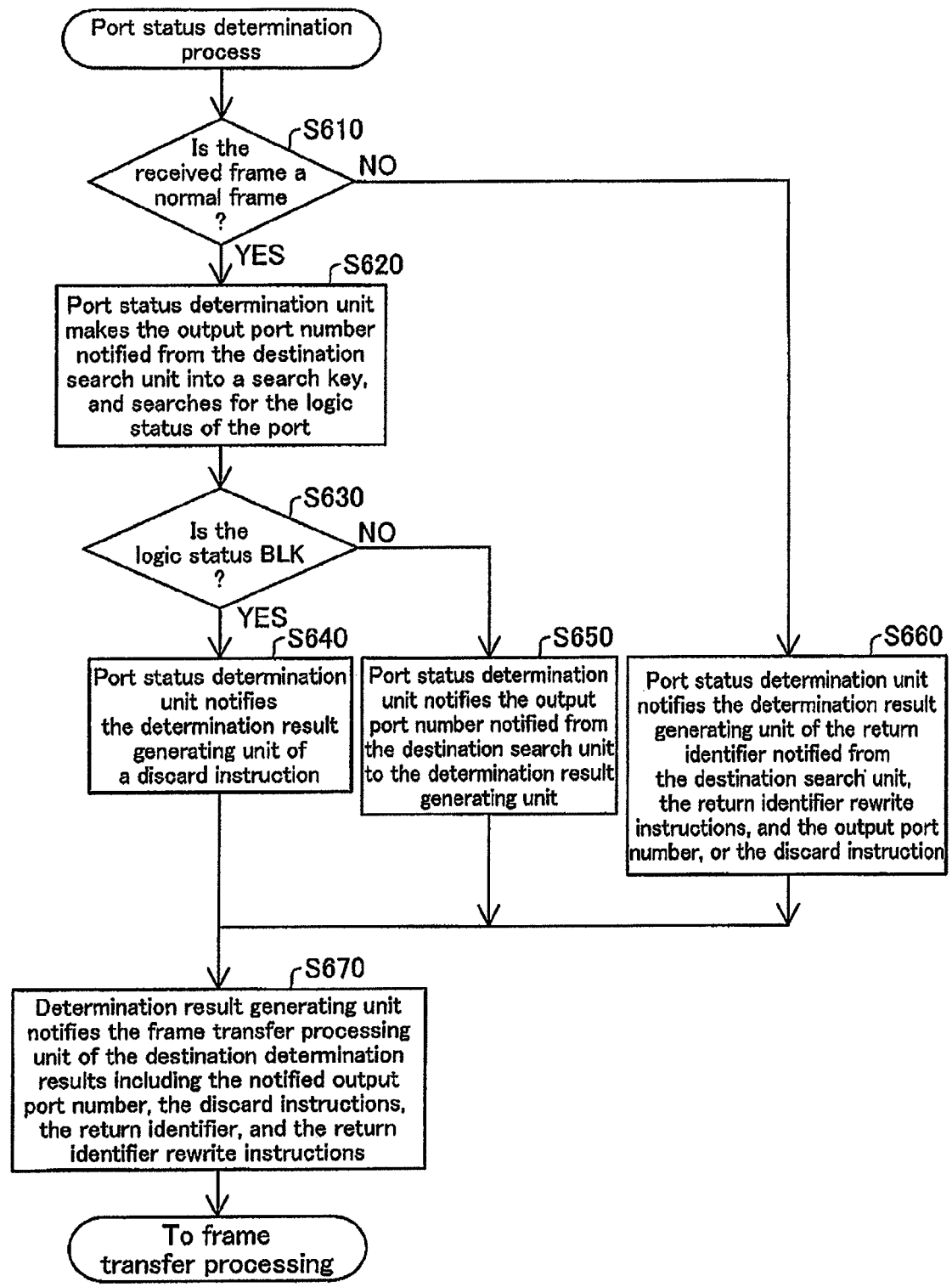
FIG. 8 shows the received frame process flow.

Then, the process advances to the port status determination process shown in FIG. 8.

Figure 6:
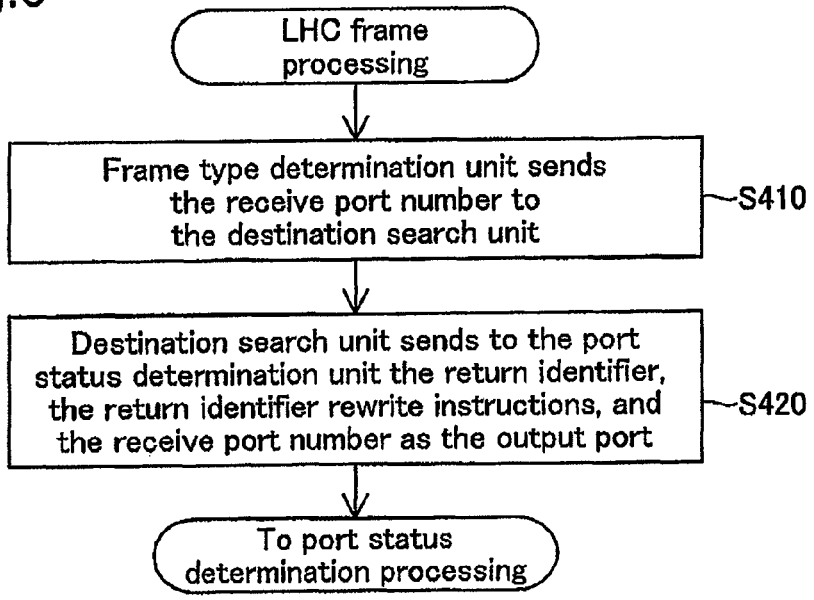
FIG. 6 shows the received frame process flow.

FIG. 6 shows a process of handling LHC frames. The frame type determination unit 410 sends the receive port number to the destination search unit 420 at step S410.

The destination search unit 420 then sends to the port status determination unit 440 the return identifier, the return identifier rewrite instructions, and the receive port number as the output port number at step S420.

Then, the process advances to the port status determination process shown in FIG. 8.

Figure 7:
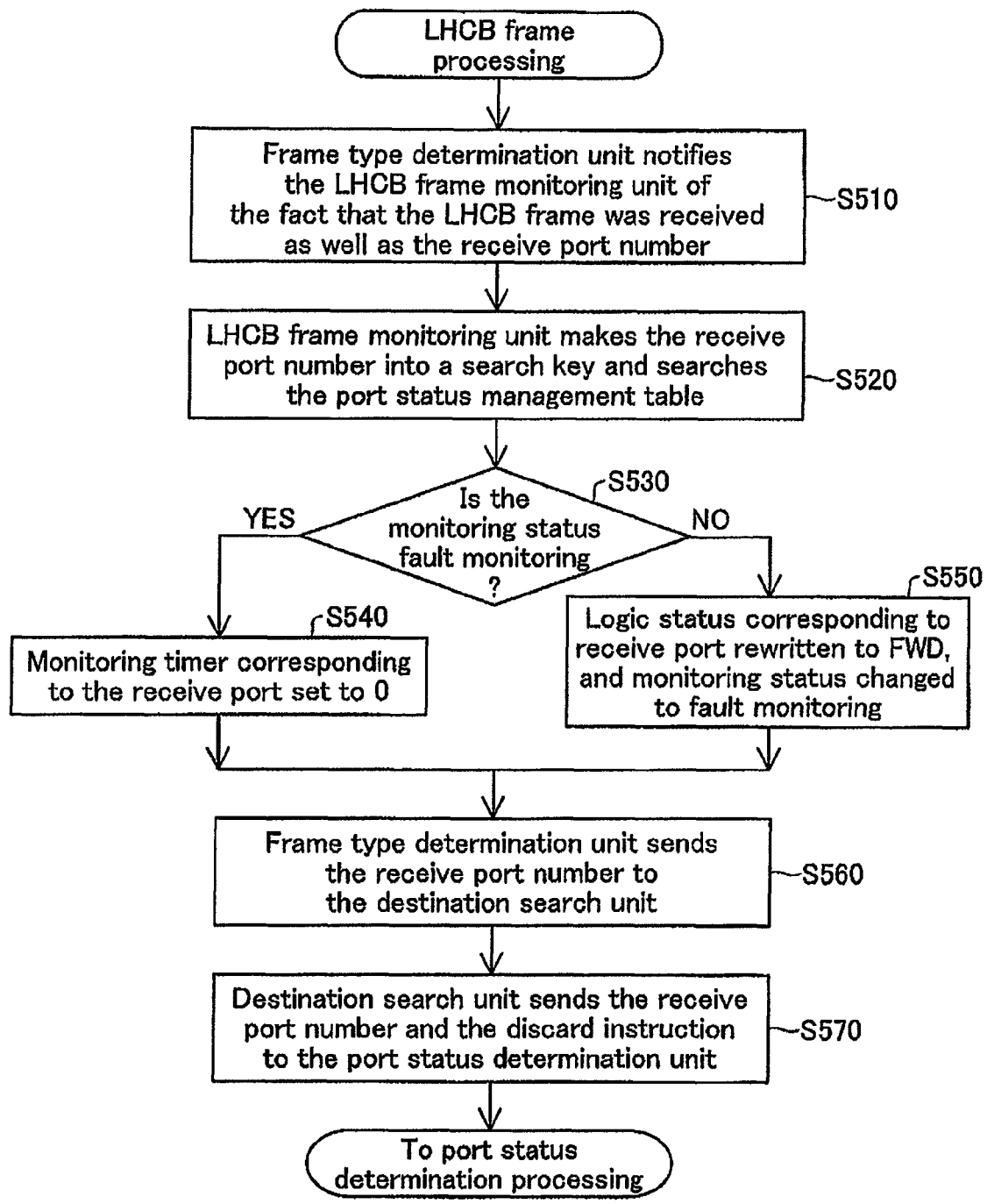
FIG. 7 shows the received frame process flow.

FIG. 7 shows a process of handling LHCB frames. The frame type determination unit 410 notifies the LHCB frame monitoring unit 470 of the fact that the LHCB frame was received as well as the receive port number at step S510. Next, the LHCB frame monitoring unit 470 makes the receive port number into a search key and searches the port status management table 450 at step S520.

FIG. 11 shows an example of the port status management table when a link fault is not occurring. FIG. 12 shows an example of the port status management table when a link fault is occurring. The port status management table 450 has a logical state, a monitoring status, a monitoring time limit, and a monitoring timer set for each port. The logical state may be set at the "frame sending and receiving possible state (FWD)" indicating that a link fault has not occurred; or the "frame sending and receiving not possible state (BLK)" indicating that a link fault has occurred. The monitoring status may be set at the "fault monitoring" indicating that monitoring of the link fault is being performed; or the "restoration monitoring" indicating that monitoring of restoration after the link fault is being performed. As the monitoring time limit is set an allowable receive interval for LHCB frames.

When the monitoring status is "fault monitoring", the monitoring timer corresponding to the receive port of the port status management table 450 is set to "0" (clear) at step S540. Meanwhile, when the monitoring status is not "fault monitoring" status, specifically, when it is the "restoration monitoring" status, the logical state corresponding to the receive port is rewritten to "FWD" (frame sending and receiving possible state) at step S550.

Next, the frame type determination unit 410 sends the receive port number to the destination search unit 420 at step S560. The destination search unit 420 sends the instruction to discard the receive port number and the received frame to the port status determination unit 440 at step S570.

Then, the process advances to the port status determination process shown in FIG. 8.

In FIG. 8, when the received frame is a normal frame, the processes of steps S620 to S650 and S670 are performed, and the process advances to the frame transfer process shown in FIG. 9. Meanwhile, when the received frame is not a normal frame, specifically, when it is an LHC frame or an LHCB frame, after execution of the processes of steps S660 and S670, the process advances to the frame transfer process shown in FIG. 9.

First, when the received frame is a normal frame, the port status determination unit 440 puts the output port number notified from the destination search unit 420 into a search key, and searches for the logical state of the port corresponding to the port status management table 450 at step S620.

When the logical state is "BLK", the port status determination unit 440 notifies the determination result generating unit 460 with instructions to discard the received frame at step S640. When the logical state is not "BLK", specifically, when the logical state is "FWD," the port status determination unit 440 notifies the output port number notified from the destination search unit 420 to the determination result generating unit 460 at step S650.

When the received frame is not a normal frame, the port status determination unit 440 notifies the determination result generating unit 460 of either: the return identifier notified from the destination search unit 420, the return identifier rewrite instructions, and the output port number; or the discard instruction at step S660.

The determination result generating unit 460 which receives notifications by the process of the respective steps S640, S650, and S660 noted above notifies the frame transfer processing unit 200 of the destination determination results including the notified output port number, the discard instructions, the return identifier, the return identifier rewrite instructions and the like at step S670.

Then, the process advances to the frame transfer process shown in FIG. 9.

In FIG. 9, the frame transfer processing unit 200 analyzes the destination determination results notified from the determination results generating unit 460 at step S710.

Then, a judgment is made of whether or not there are received frame discard instructions in the destination determination results at step S720.

When there is a discard instruction, the received frame is discarded at step S730, and the frame processing ends.

Meanwhile, when there is no discard instruction, a further judgment is made of whether or not there is a return identifier rewrite instruction at step S740.

When there is a return identifier rewrite instruction, the return identifier stored in the frame storage memory is rewritten at step S750. Then, the frame for which the return identifier is rewritten is sent from the output port at step S760, and the frame processing ends.

Figure 13:
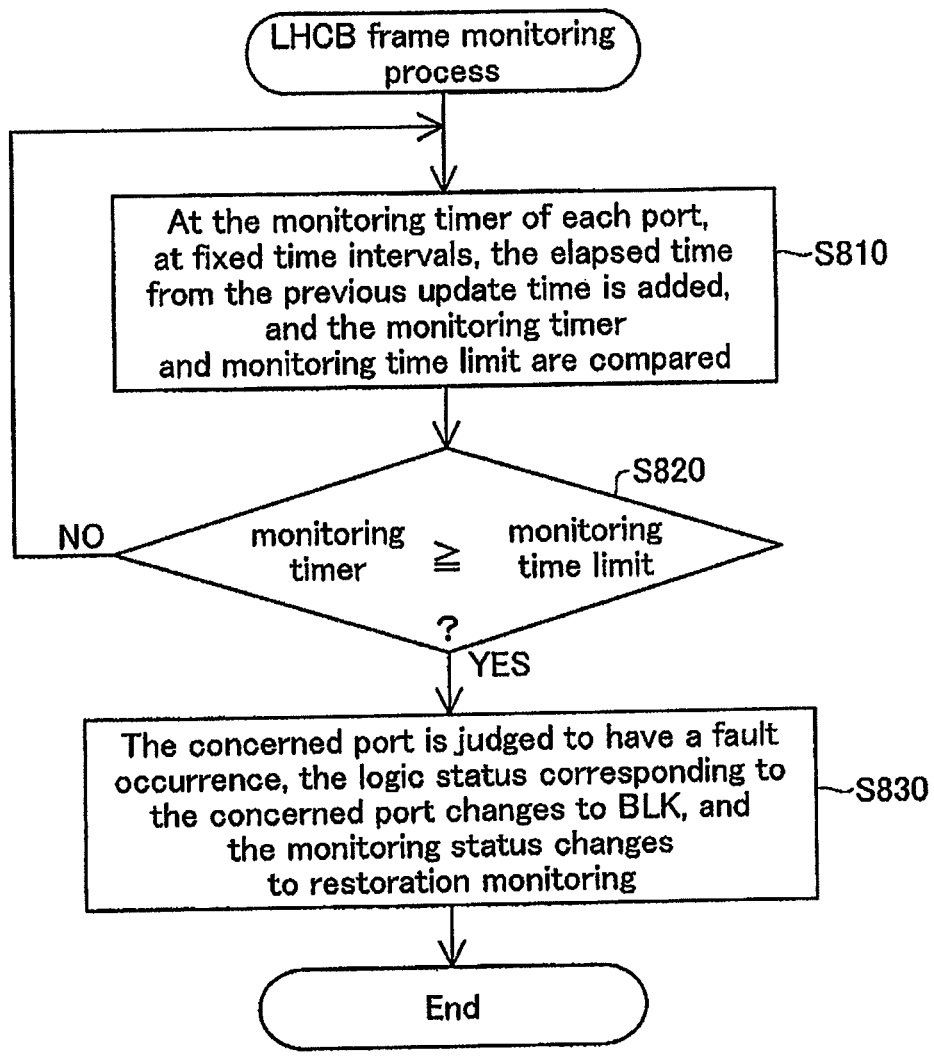
FIG. 13 shows the flow of the LHCB frame monitoring process.

FIG. 13 shows the flow of the LHCB frame monitoring process. The status notification frame monitoring unit 470, responsive to an instruction to monitor LHCB frames, executes the LHCB frame monitoring process shown in FIG. 13 when the monitoring status of the monitoring target port TP goes from "restoration monitoring" to "fault monitoring."

At the monitoring timer of the port corresponding to the monitoring target port TP of the port status management table 450, at fixed time intervals, the elapsed time from the previous update time is added, and the resulting monitoring timer and the monitoring time limit are compared at step S810. The fixed time interval is set to a shorter time than the monitoring time limit.

Then, a judgment is made of whether or not the monitoring timer is equal to or greater than the monitoring time limit at step S820. When the monitoring timer is less than the monitoring time limit, the process of step S810 is repeated until the monitoring timer is equal to or greater than the monitoring time limit. Meanwhile, when the monitoring timer is equal to or greater than the monitoring time limit, the concerned port is judged to have a fault occurrence, and as shown in FIG. 12, the logical state for the concerned port changes to BLK, and the monitoring status changes to "restoration monitoring" at step S830. Then, the LHCB frame monitoring process ends.

Figure 14:
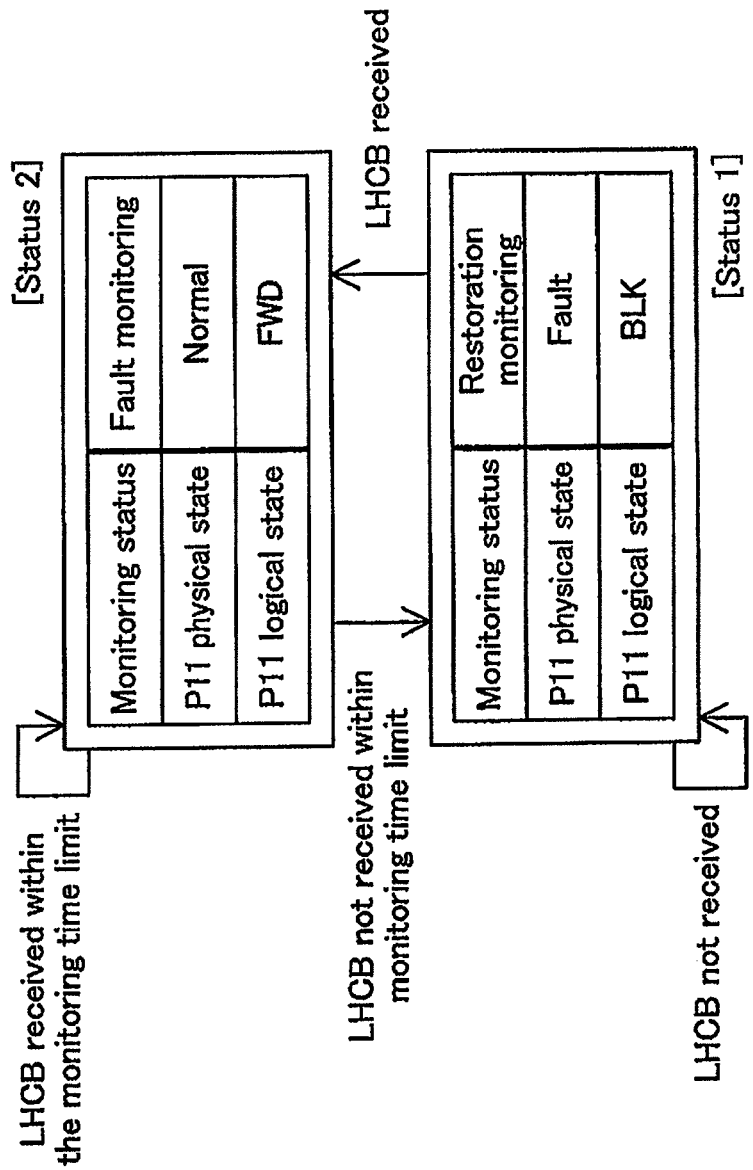
FIG. 14 shows an example of the status transition of the port monitoring status and the logical state by execution of the LHCB frame monitoring process.

FIG. 14 shows an example of the status transition of the port monitoring status and the logical state by execution of the LHCB frame monitoring process. Note that FIG. 14 shows an example of the status transition relating to the port P11 generated through the LHCB frame monitoring operation executed by the LHCB frame monitoring unit 470(1) of the first switch SW1.

First, when the port P11 has not received an LHCB frame, a fault may have occurred at the first communication link L112 or the second communication link L121 of the physical line PL1 connected to the port P11, and the port P11 physical state is judged to be "faulty." At this time, the monitoring status of the port P11 of the port status management table 450(1) is set to "restoration monitoring," the logical state of the port P11 is set to "BLK" status, and the port P11 is in a state for which frame sending and receiving is not possible. Then, this status (called "status 1") is maintained until an LHCB frame is received.

When the LHCB frame is received at the status 1, the physical state of the port P11 is judged to be "normal." At this time, the port P11 monitoring status in the port status management table 450(1) is changed to the "fault monitoring", and the logical state of the port P11 is changed to the "FWD", and frame sending and receiving is possible with the port P11. Then, this status (called "status 2") is maintained while the LHCB frame is being repeatedly received within the monitoring time limit.

When the LHCB frame is not received within the monitoring time limit at the status 2, the status changes to status 1, and frame sending and receiving is not possible with the port P11.

As described above, by monitoring the receiving of LHCB frames which are returns of the sent LHC frames, it is possible to automatically change to the status 1 for which the monitoring status is "restoration monitoring" or to the status 2 for which the monitoring status is "fault monitoring." As a result, it is possible to automatically perform port blocking or closing when a unidirectional link fault has occurred and to perform port restoration when a fault has been eliminated.

Note that for the description of the aforementioned status transition, we described an example of the port P11 for which the physical line PL1 is connected between the first switch SW1 and the second switch SW2, but this is the same for other ports as well.

Figure 15:
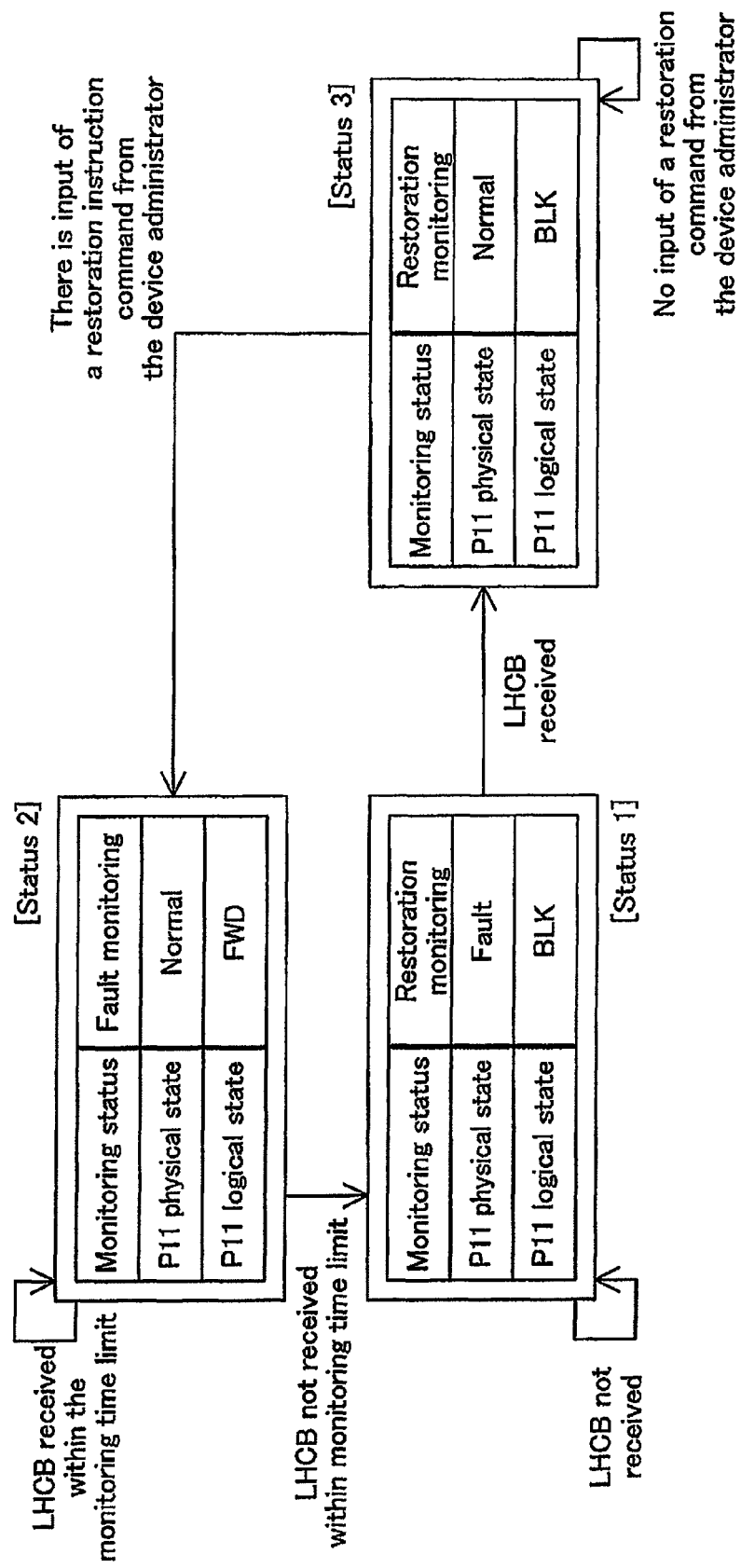
FIG. 15 shows another example of the status transition of the port monitoring status and the logical state by execution of the LHCB frame monitoring process.

FIG. 15 shows another example of the status transition of the port monitoring status and logical state by execution of the LHCB frame monitoring process. FIG. 15 also shows an example of status transition relating to the port P11 generated through the LHCB frame monitoring operation executed by the LHCB frame monitoring unit 470(1) of the first switch SW1.

When an LHCB frame is received within the monitoring time limit at the status 1 in which the monitoring status is the "restoration monitoring", rather than the automatic restoration shown in FIG. 14, the status changes to a "restoration instruction wait" (called "status 3"). Then upon receiving a restoration instruction command from the device administrator person, the status returns to status 1 which is the "fault monitoring" status, whereby the link between the switch SW1 and the switch SW2 is restored.

With the first embodiment noted above, the first switch SW1 which executes link fault detection sends an LHC frame from the port P11 of the monitoring target at each fixed frame sending time, and the second switch SW2 which has received the LHC frame return an LHCB frame. Then, the first switch SW1 judges that the link is normal when the LHCB frame is received within the monitoring time limit, and sets the logical state of the port P11 to frame sending and receiving possible (FWD), and when not received within the monitoring time limit, judges that a fault has occurred with the link, and sets the logical state of the port P11 to frame sending and receiving not possible (BLK). By doing this, it is possible to detect that a link fault has occurred at least at one of the two links L112 and L121 of the physical line PL1 connected to the port P11, and to block frame sending and receiving by the port P11.

Here, the conventional UDLD performs analysis of the various parameters included in the received frame using software to detect the link fault, and detects link fault based on those analysis results, so there is the problem that the link fault detection time is considerably long.

On the other hand, with the link fault detection of this embodiment, it is possible to detect link fault by whether or not it is possible to receive an LHCB frame as a return of an LHC frame within the monitoring time limit. Note that the LHC frame and the LHCB frame can be easily judged based on the LHC frame dedicated destination MAC address. Therefore, compared to the prior art, it is possible to detect a link fault more easily with shorter detection time. Because of this, when a link fault is occurred, it is possible to shorten the time required for blocking the corresponding port and switching the link.

Also, when the link fault is eliminated, the first switch SW1 restarts receiving of the LHCB frame within the monitoring time limit. By doing this, the logical state of the port for which the fault occurred is automatically set from frame sending and receiving not possible (BLK) to frame sending and receiving possible (FWD), and it is possible to automatically restore the link status from the fault state to the normal state.

Note that with the embodiment noted above, distinguishing between the normal frames and the LHC frames and LHCB frames is done using the destination MAC address (dedicated MAC address allocated to the LHC frames and LHCB frames), and distinguishing between the LHC frames and LHCB frames is performed using the return identifiers. However, the present invention is not limited to this arrangement, and it is also possible to distinguish these by changing the destination MAC address, the layer 2 header type, or the VLAN-ID according to the frame types including the LHC frame, the LHCB frame and the normal frame. It is also possible to distinguish between the LHC frames and LHCB frames and the normal frames by combining these parameters or attributes.

Also, with the embodiment noted above, we described an example for which the link fault of the two links L112 and L121 of the physical line PL1 connecting between the first switch SW1 port P11 and the second switch SW2 port 21 is detected by the first switch SW1, and when a link fault has occurred, the logical state of the port P11 is made to be frame sending and receiving not possible (blocking), but it is also possible to have the second switch SW2 detect the link fault. It is also possible to have the link fault detected by both the first switch SW1 and the second switch SW2.

B. Second Embodiment

Figure 16:
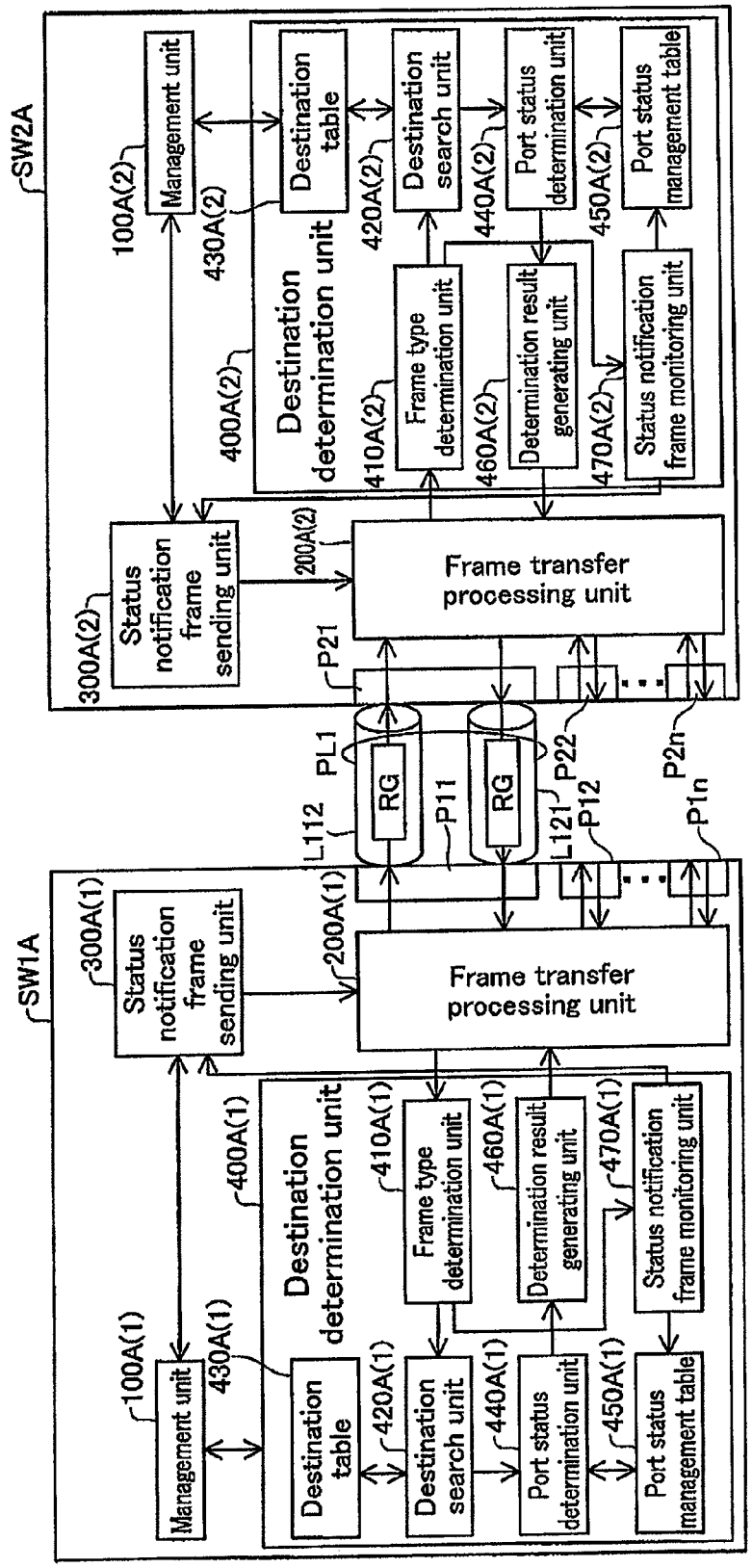
FIG. 16 is a block diagram for describing the unidirectional link fault detection executed with the communication device as the first embodiment.
Figure 17:
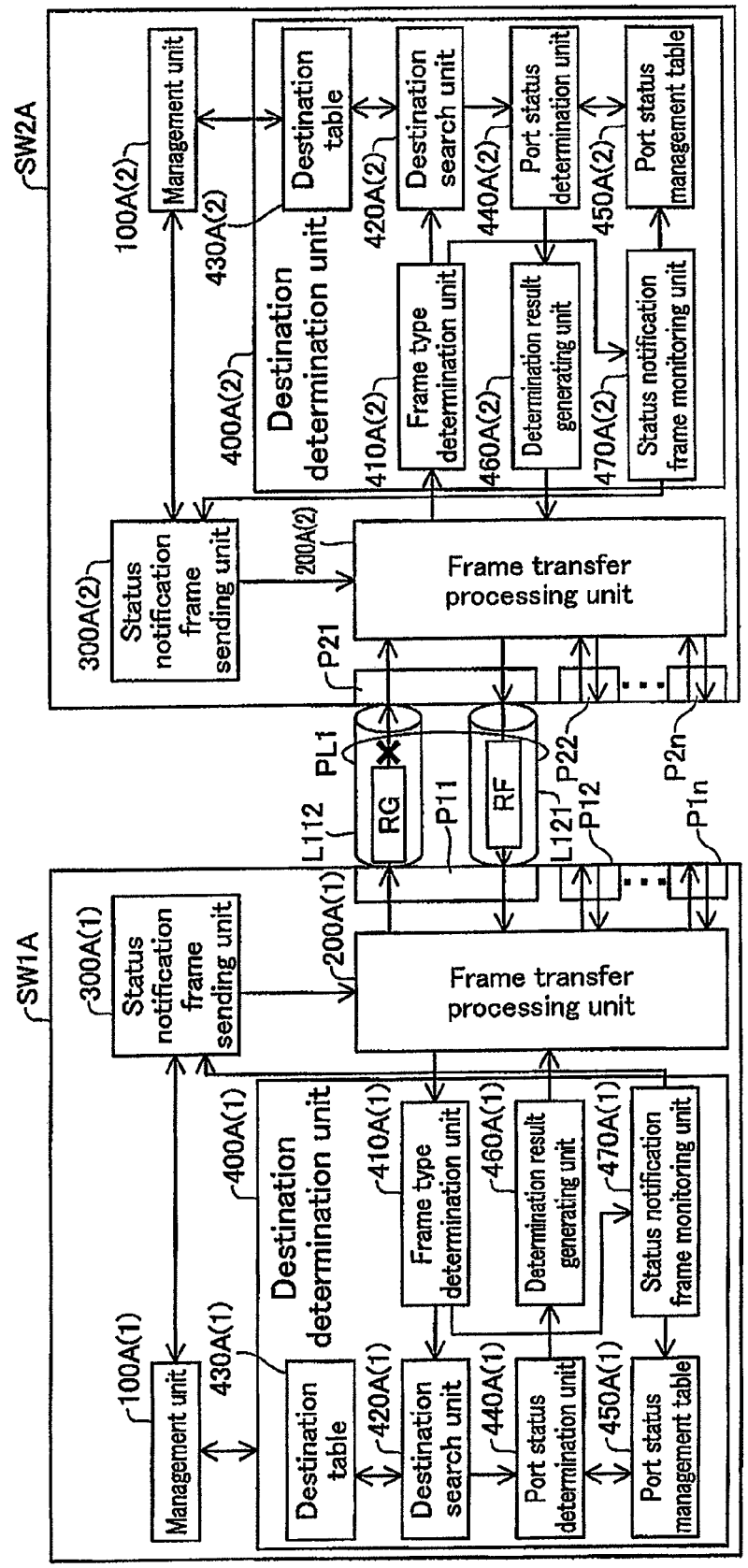
FIG. 17 is a block diagram for describing the unidirectional link fault detection executed with the communication device as the second embodiment.

FIG. 16 and FIG. 17 are block diagrams for explaining the unidirectional link fault detection executed with the communication device as the second embodiment, where FIG. 16 shows a case of a normal status when a fault has not occurred, and FIG. 17 shows a case of a fault occurrence state.

A switch SW1A, which is the first communication device, has a plurality of ports P11 to P1n where n is an integer of 2 or greater. The first switch SW is connected via the physical line PL1 connected to the first port P11 to the first port P21 of the plurality of ports P21 to P2n provided in a switch SW2A which is the second communication device. The physical line PL1 is constituted by two links (bidirectional link), including a first link L112 on which are sent Ethernet frames from the first switch SW1A toward the second switch SW2A, and a second link L121 on which frames are sent from the second switch SW2A to the first switch SW1A. Note that with the second embodiment, the same as with the first embodiment, to make the description easier, we will omit communication devices connected to other ports of the first switch SW and the second switch SW2A. Also, the first switch SW will be described in terms of unidirectional link fault detection for the communication device of the second embodiment as an example of a case of detecting faults of the two links L112 and L121 of the physical line PL1 between the first switch SW and the second switch SW2A. Note that hereafter, the switch as the first communication device is sometimes called the "device of interest," and the switch as the second communication device is sometimes called the "counterpart device."

We will give a brief description of a summary of the fault detection, by the first switch SW1, of the two links L112 and L121 of the physical line PL1 between the first switch SW1 and the second switch SW2A.

First, as shown in FIG. 16, when the link is normal, an RG (Remote Good) frame indicating that the link is normal is sent via the first communication link L112 from the first switch SW to the second switch SW2A. Also, the second switch SW2A similarly sends an RG frame via the second communication link L121 from the second switch SW2A to the first switch SW1A. Then, the first switch SW1A, upon receiving the RG frame, judges that the two links L112 and L121 of the physical line PL1 connected via the port P11 are normal. Similarly, the second switch SW2A, upon receiving the RG frame, judges that the two links L112 and L121 of the physical line PL1 connected via the port P21 are normal.

Meanwhile, as shown in FIG. 17, when a fault has occurred on the first communication link L112, the second switch SW2 cannot receive the RG frames from the first switch SW1, and sends an RF (Remote Failure) frame indicating that there is a fault with the link from the switch SW (counterpart device) to the switch SW2A (device of interest).

Then, the first switch SW1A, upon receiving the RF frame, is able to judge that a fault has occurred in the first communication link L112 of the physical line PL1 connected via the port P11.

Note that when a fault has occurred in the second communication link L121, the first switch SW is not able to receive either the RG frame or the RF frame, so in this case, it is possible to judge that a fault has occurred in at least the second communication link L121. Also, at this time, when the RG frame is received by the second switch SW2A from the first switch SW1A, it is possible for the second switch SW2A to judge that a fault has occurred in the second communication link L121.

To execute the fault detection noted above, the first switch SW and the second switch SW2A are constituted by the functional blocks described below.

The first switch SW and the second switch SW2A have a management unit 100A, a frame transfer processing unit 200A, a status notification frame sending unit 300A, and a destination determination unit 400A. The destination determination unit 400A includes a frame type determination unit 410A, a destination search unit 420A, a destination table 430A, a port status determination unit 440A, a port status management table 450A, a determination result generating unit 460A, and a status notification frame monitoring unit 470A.

Note that to distinguish between the first switch SW block and the second switch SW2A block, (1) is added to the code of the first switch SW block, and (2) is added to the reference characters of the second switch SW2A block.

The fault detection of the two links L112 and L121 of the physical line PL1 between the first switch SW1A and the second switch SW2A is executed by the functional blocks of the first switch SW1A and the second switch SW2A through a link fault monitoring start process, a received frame process, and a status notification frame monitoring process described hereafter.

Figure 18:
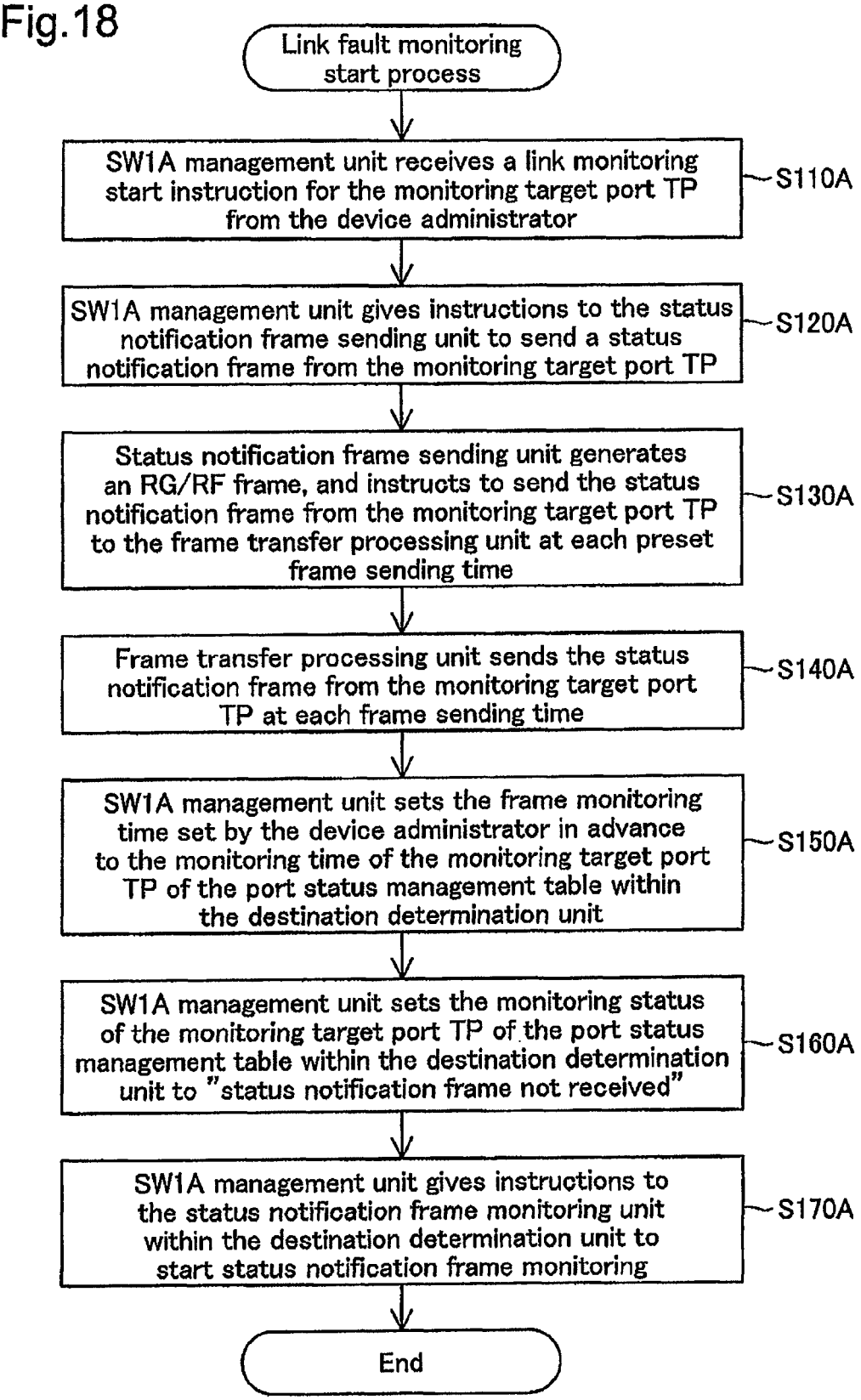
FIG. 18 shows the process flow for starting link fault monitoring.
Figure 19:
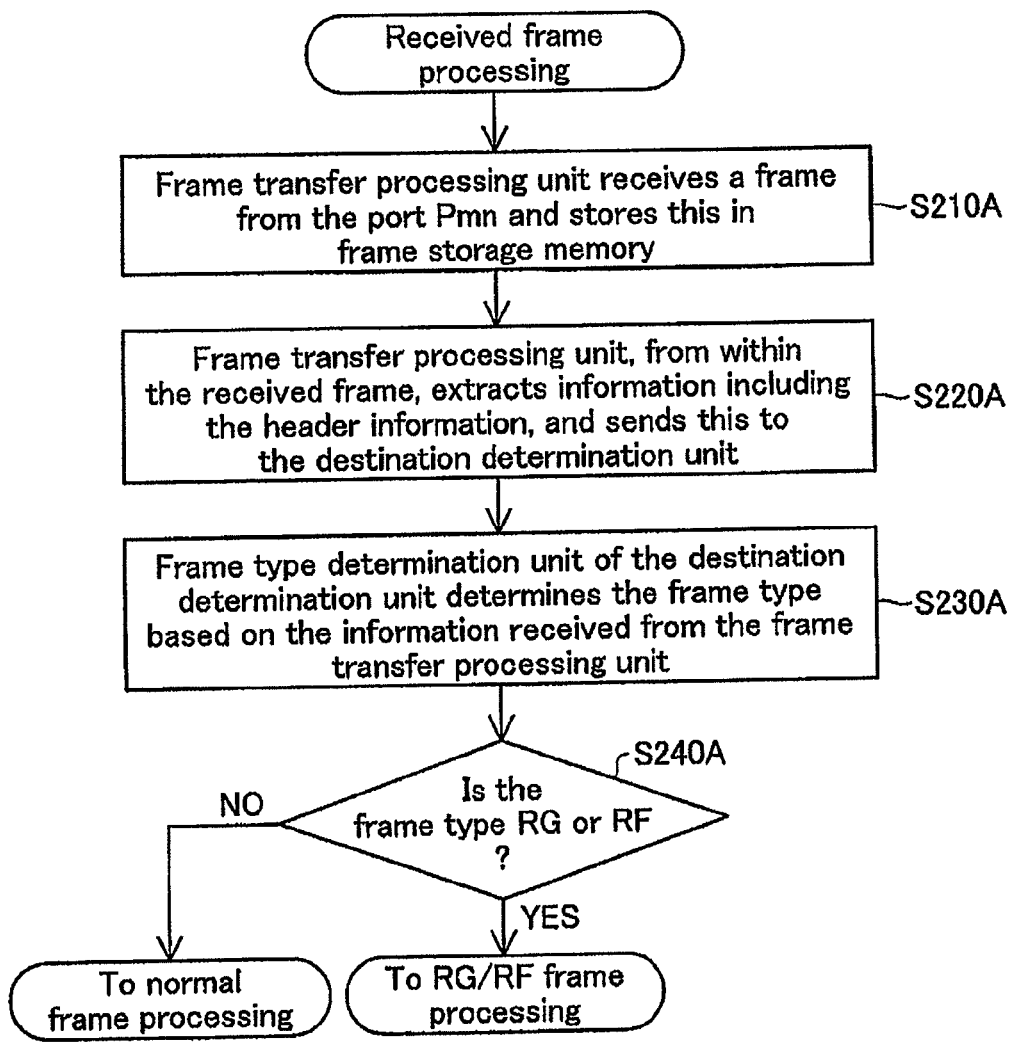
FIG. 19 shows the received frame process flow.

FIG. 18 shows the process flow for the link fault monitoring start process. This link fault monitoring start process is executed each time either of the first and second switch SW1, SW2 is activated. In light of this, with the description hereafter, the description is done without adding codes (1) and (2) to the reference characters.

First, the management unit 100A receives an instruction to start link monitoring for the monitoring target port TP from the device administrator person at step S110A, and instructs to the status notification frame sending unit 300A to send a status notification frame from the monitoring target port TP at step S120A. The former instruction is performed by having a terminal (not illustrated) connected to the switch, and having the device administrator person input from this terminal to the switch.

Then, the status notification frame sending unit 300A generates a status notification frame, and gives an instruction to the frame transfer processing unit 200A to send the status notification frame from the monitoring target port TP at each preset frame sending time at step S130A. Note that the status notification frame sending unit 300A, first, after receiving the instruction for sending the status notification frame, initially generates as the status notification frame an RF frame, and thereafter, generates RG frames or RF frames according to the instructions from the status notification frame monitoring unit described later.

Then, the frame transfer processing unit 200A sends the status notification frame from the monitoring target port TP at each frame sending time at step S140A. Note that as the monitoring target port TP, with the first switch SW1A, one or more of the plurality of ports P11 to P1n is selected, and with the second switch SW2, one or more of the plurality of ports P21 to P2n is selected.

Next, the management unit 100A sets the frame monitoring time limit which is set by the device administrator person in advance to the monitoring time limit of the monitoring target port TP of the port status management table 450A within the destination determination unit 400A at step S150A. This setting, the same as the link monitoring start instruction, is performed by connecting the switch to a terminal (not illustrated), and by having the device administrator person input to the switch from this terminal. Also, the management unit 100A sets the monitoring status of the monitoring target port TP of the port status management table 450A within the destination determination unit 400A to status notification frame not received at step S160A. Note that this monitoring status will be described later.

Then, the management unit 100A gives an instruction to the status notification frame monitoring unit 470A within the destination determination unit 400A to start the status notification frame monitoring at step S170A. The status notification frame monitoring process executed by the status notification frame monitoring unit 470A is described later.

FIG. 19 to FIG. 22 are explanatory drawings showing the process flow of the received frames. This frame processing is started by the arrival of frames to any of the respective ports for either the first or second switch SW or SW2A. In light of this, with this description, to distinguish between the first switch SW1 and the second switch SW2, we will describe this without adding the codes (1) and (2).

First, the frame transfer processing unit 200A receives the frame from the port Pmn (with the first switch SW1 this is P11 to P1n, and with the second switch SW2 this is P21 to P2n) at which the frame arrived, and stores this in a frame storage memory (not illustrated) at step S210A. Then, the frame transfer processing unit 200A, from within the received frame, extracts header information and fault detection information for use in the fault detection, and sends the information to the destination determination unit 400A at step S220A. The fault detection information includes a return identifier, and the header information includes a destination MAC address, a source MAC address, or a VLAN-ID.

Next, the frame type determination unit 410A of the destination determination unit 400A determines the frame type based on the header information and the fault detection information received from the frame transfer processing unit 200A at step S230A. When the determined frame type is a normal Ethernet frame, the process advances to the normal frame processing. Also, when the determined frame type is an RG frame or an RF frame, the process advances to the RG/RF frame processing shown in FIG. 20.

Figure 23:
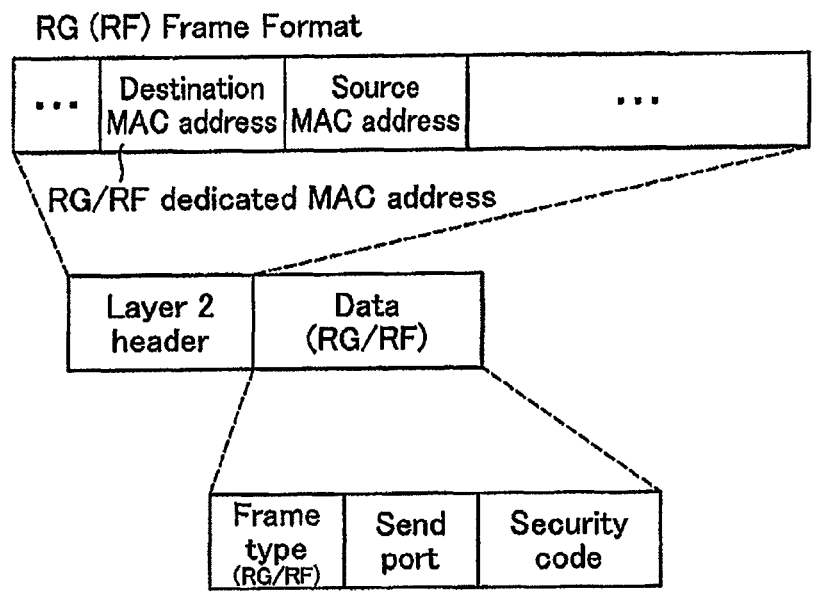
FIG. 23 shows the RG frame and the RF frame format.

FIG. 23 shows the RG frame and RF frame format. The RG frame and RF frame, the same as with normal Ethernet frames, includes a layer 2 header field and a data field. However, in the case of the status notification frame (RG frame and the RF frame), inserted in the destination MAC address field is a MAC address allocated exclusively for the status notification frame (status notification frame dedicated MAC address). Therefore, it is possible to perform the distinguishing between the normal frame and the status notification frame based on the destination MAC address. Also, identification information for identifying RG or RF is inserted in the frame type field in the data field. Therefore, it is possible to perform distinguishing between the RG frame and the RF frame based on the frame type field.

The normal frame processing is the same as the processing explained with reference to FIG. 5 with the first embodiment, so its description is omitted hereafter.

Figure 20:
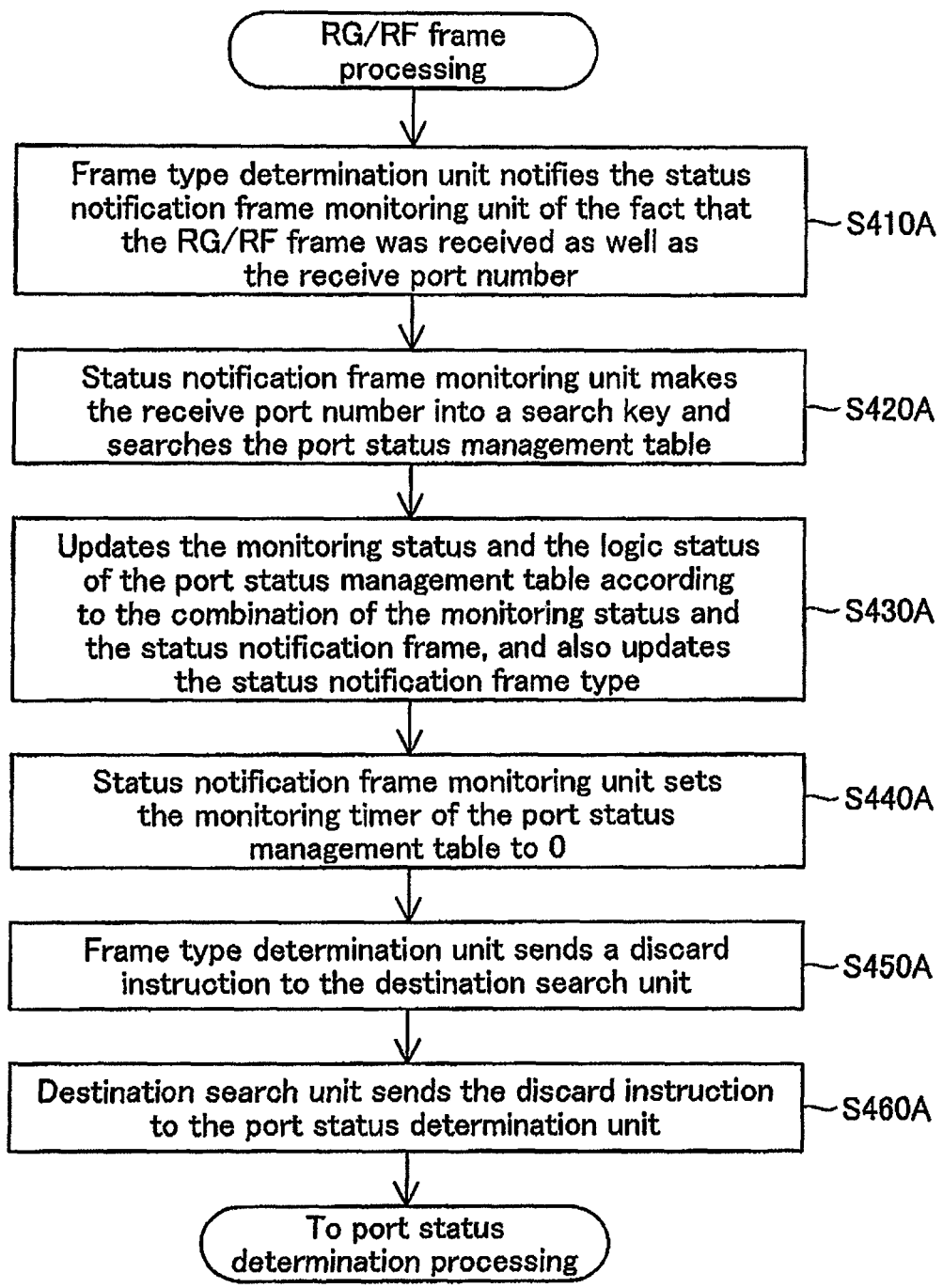
FIG. 20 shows the received frame process flow.

FIG. 20 shows a flowchart of the RG/RF frame process. The frame type determination unit 410A notifies the status notification frame monitoring unit 470A of the fact that the RG/RF frame is received and of the receive port at step S410A.

Next, the status notification frame monitoring unit 470A puts the receive port number into the search key and searches the port status management table at step S420A.

FIG. 24 shows an example of the port status management table when a link fault is not occurred. FIG. 25 shows an example of the port status management table when a link fault is occurred. The port status management table has the logical state, the monitoring status, the monitoring time limit, and the monitoring timer for each port. The logical state is set at "frame sending and receiving possible (FWD)" when a link fault has not occurred, or at "frame sending and receiving not possible (BLK)" when a link fault has occurred. The monitoring status is set at "RG monitoring" indicating the state of periodically receiving RG frames, or "RF monitoring" indicating the state of periodically receiving RF frames, or "RG/ RF not received" indicating the state of not having received RG frames and RF frames. The monitoring time limit is set at the allowable receive interval for RG frames or RF frames.

Next, the status notification frame monitoring unit 470A updates the monitoring status and the logical state for the receive port in the port status management table 450A according to the combination of the monitoring status and the status notification frame (RG frame or RF frame), and also updates the type of the status notification frame to be sent at step S430A. The updating of the monitoring status, the logical state, and the status notification frame type will be described later.

Then, the status notification frame monitoring unit 470A sets the monitoring timer for the receive port in the port status management table 450 to "0" (clear) at step S440A.

Next, the frame type determination unit 410 sends an instruction to discard the received frame to the destination search unit 420A at step S450A. The destination search unit 420A sends the discard instruction to the port status determination unit 440A at step S460A.

Figure 21:
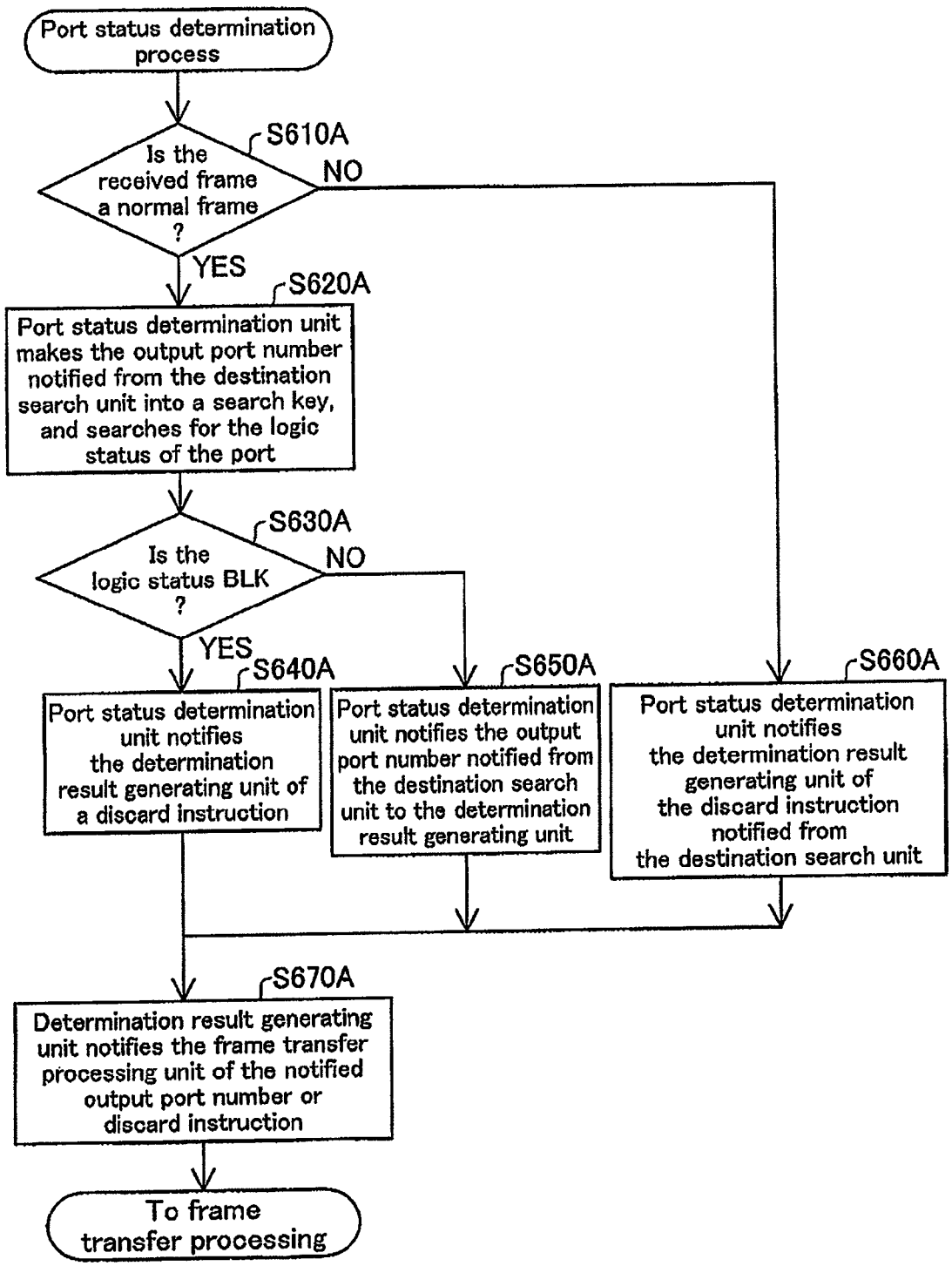
FIG. 21 shows the received frame process flow.

Then, the process advances to the port status determination process shown in FIG. 21.

FIG. 21 shows the port status determination process. When the received frame is a normal frame at step S610A, the processes of steps S620A to S650A and S670A are executed, and when the received frame is not a normal frame, specifically, when it is an RG frame or an RF frame, after execution of the processes of steps S660A and S670A, the frame processing ends.

Here, when the received frame is a normal frame, first, the port status determination unit 440A puts the output port number notified from the destination search unit 420A into a search key, and searches for the logical state of the port in the port status management table 450A at step S620A.

When the logical state is "BLK" at step S630A, the port status determination unit 440A notifies the determination result generating unit 460A of an instruction to discard the received frame at step S640A. When the logical state is not "BLK", specifically, when the logical state is "FWD," the port status determination unit 440A notifies the determination result generating unit 460A of the output port number notified from the destination search unit 420A at step S650A.

Meanwhile, when the received frame is not a normal frame, the port status determination unit 440A notifies the determination result generating unit 460A of the discard instruction notified from the destination search unit 420A at step S660A.

Next, the determination result generating unit 460A notifies the frame transfer processing unit 200A of the notified output port number or the discard instruction at step S670A.

Figure 22:
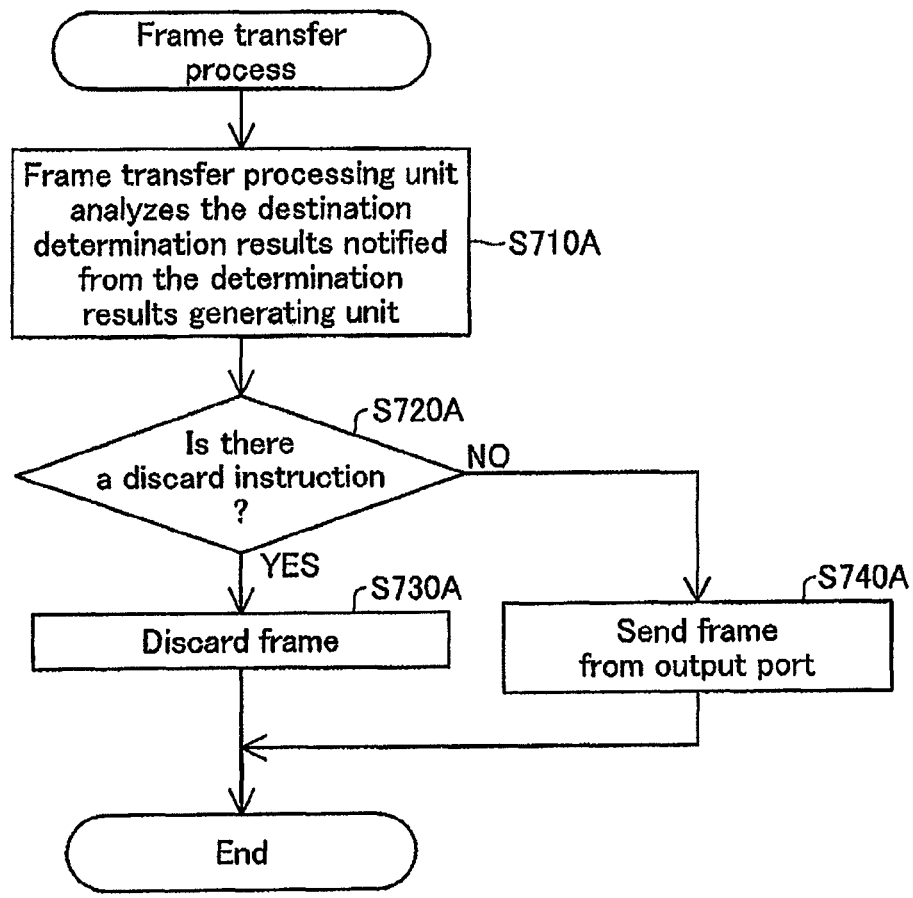
FIG. 22 shows the received frame process flow.

Then, the process advances to the frame transfer process shown in FIG. 22.

With the frame transfer process of FIG. 22, first, the frame transfer processing unit 200A analyzes the destination determination results notified from the determination results generating unit 460A at step S710A.

Then, a judgment is made of whether or not there is received a frame discard instruction at step S720A.

When there is a discard instruction, the received frame is discarded at step S730A, and the frame processing ends.

Meanwhile, when there is no discard instruction, the received frame is sent from the output port at step S740A, and the frame processing ends.

Figure 26:
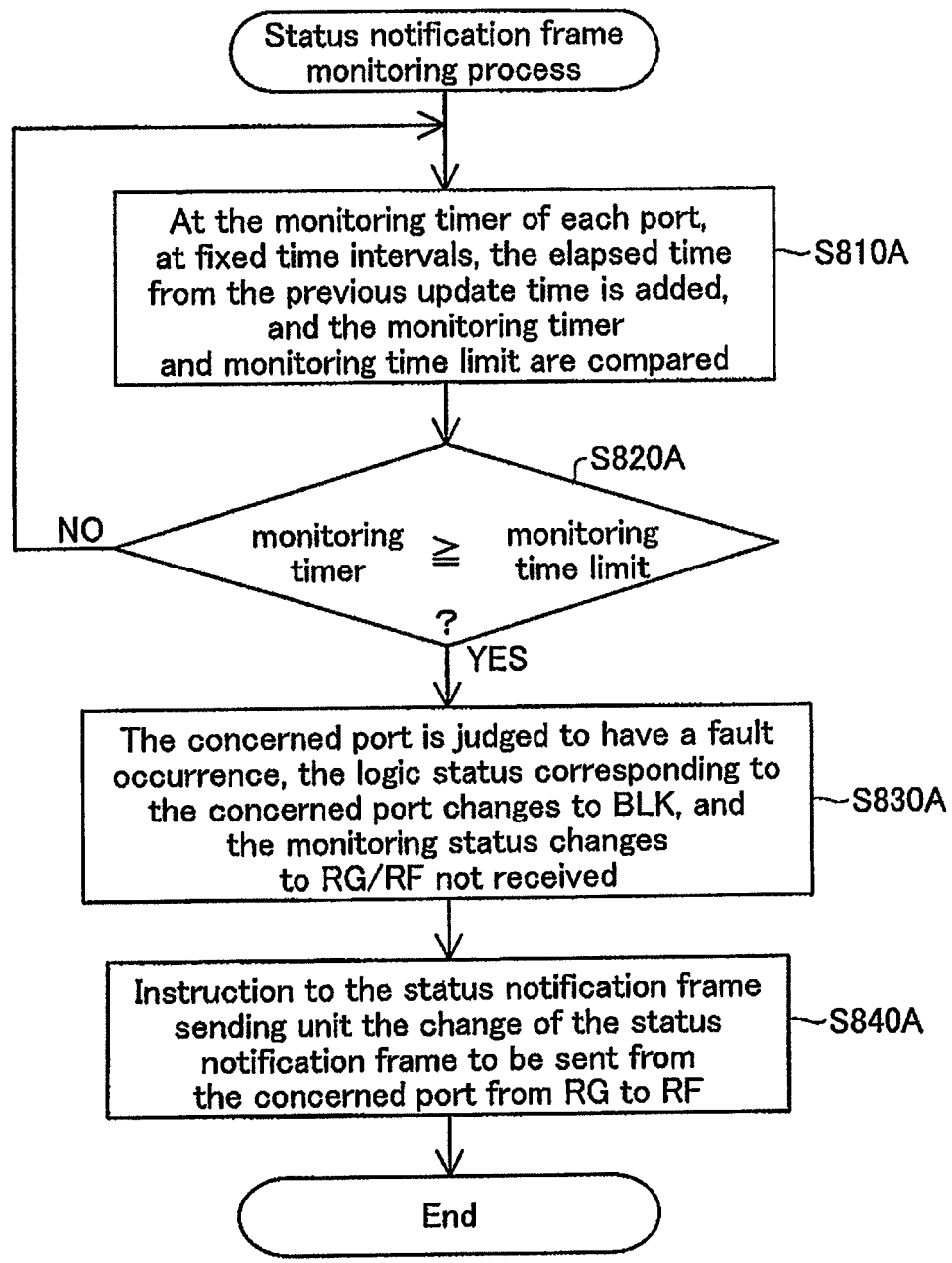
FIG. 26 shows the flow of the status notification frame monitoring process.

FIG. 26 shows the flow of the status notification frame monitoring process. This status notification frame monitoring process is started when the monitoring status of the monitoring target port TP becomes "RG monitoring" or "RF monitoring" from "RG/RF not received" in the status notification frame monitoring unit 470.

At the monitoring timer of each port, at fixed time intervals, the elapsed time from the previous update time is added, and the resulting monitoring timer and the monitoring time limit are compared at step S810A. The fixed time interval is set to a shorter time than the monitoring time limit.

Then, a judgment is made of whether or not the monitoring timer is equal to or greater than the monitoring time limit at step S820A. When the monitoring timer is less than the monitoring time limit, the process of step S810A is repeated until the monitoring timer is equal to or greater than the monitoring time limit. Meanwhile, when the monitoring timer is equal to or greater than the monitoring time limit, the concerned port is judged to have a fault occurrence, and as shown in FIG. 25, the logical state for the concerned port changes to BLK, and the monitoring status changes to "RG/RF not received" at step S830A. Then, there is an instruction to the status notification frame sending unit 300A to change the frame type to be sent from the concerned port from the RG frame to the RF frame at step S840A, and the status notification frame monitoring process ends.

Figure 27:
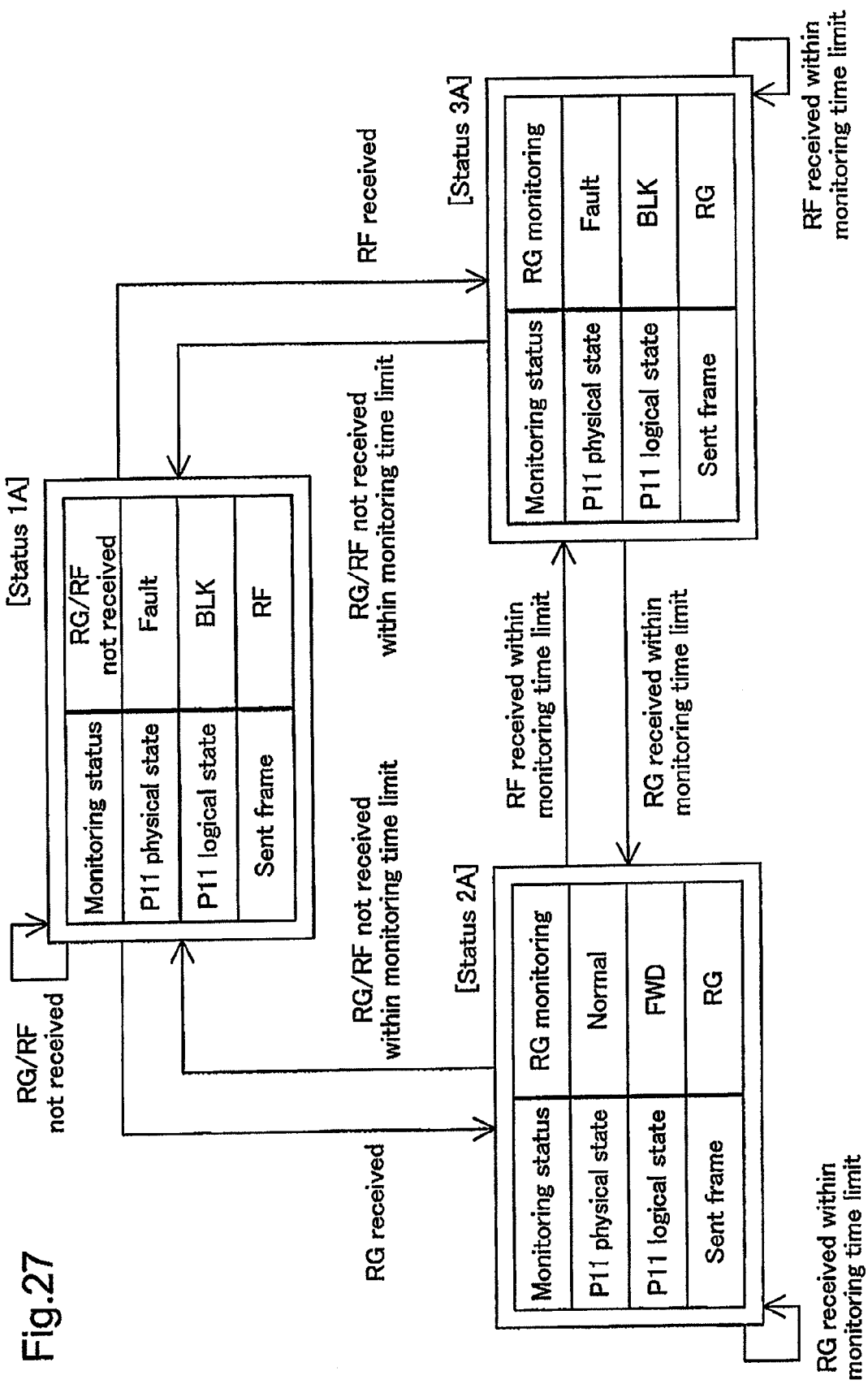
FIG. 27 shows an example of the status transition of the port monitoring status and the logical state by execution of the status notification frame monitoring process.

FIG. 27 shows an example of the status transition of the port monitoring status and the logical state by execution of the status notification frame monitoring process. Note that FIG. 27 shows an example of the status transition generated through the status notification frame monitoring operation executed by the status notification frame monitoring unit 470A(1) of the first switch SW1A.

First, when the port P11 has not received either of the RG frame and the RF frame, a fault may have occurred at the first communication link L112 or the second communication link L121 of the physical line PL1 connected to the port P11, and the port P11 physical state is judged to be "faulty." At this time, the monitoring status of the port P11 of the port status management table 450A(1) is set to "RG/RF not received," the logical state of the port P11 is set to "BLK" status, and the port P11 is in a state for which frame sending and receiving is not possible. Also, the type of the status notification frame to be sent is set to "RF frame." Then, this status (called "status 1A") is maintained until an RG frame or an RF frame is received.

When the RG frame is received at the status 1A, the physical state of the port P11 is judged to be "normal." At this time, the port P11 monitoring status in the port status management table 450A(1) is changed to the "RG monitoring", and the logical state of the port P11 is changed to the "FWD", and frame sending and receiving is possible with the port P11. Then, this status (called "status 2A") is maintained while the RG frame is being repeatedly received within the monitoring time limit.

When the RF frame is received at status 1A, a fault has occurred in the second communication link L121 of the physical line PL1 connected to the port P11, and the physical state of the port P11 is judged to be "faulty." At this time, the port P11 monitoring status in the port status management table 450A(1) is changed to "RF monitoring", the port P11 logical state is changed to "BLK", and frame sending and receiving is not possible for the port P11. Also, the type of the status notification frame to be sent is changed to "RG frame." Then, this status (called "status 3A") is maintained while the RF frame is being repeatedly received within the monitoring time limit.

When neither the RG frame nor the RF frame is received within the monitoring time limit at the status 2A, the status changes to status 1A. Also, when the RF frame is received within the monitoring time limit at the status 2A, the status changes to status 3A.

When neither the RG frame nor the RF frame is received within the monitoring time limit at the status 3A, the status changes to status 1A. Also, when the RG frame is received within the monitoring time limit at the status 3A, the status changes to status 2A.

As described above, by monitoring the receiving of status notification frames, it is possible to automatically change to either one of the status 1A for which the logical state is "RG/RF not received," the status 2A which is "RG monitoring," or the status 3A which is "RF monitoring." As a result, it is possible to automatically perform port blocking when a unidirectional link fault has occurred, and to perform port restoration when a fault has been eliminated.

Note that for the description of the aforementioned status transition, we describe an example of controlling the logical state of the port P11 for which a fault is detected for the first switch SW1A, but the same is also true for the second switch SW2A, and it is possible to control the logical state of the port P12 for which a fault is detected for the switch SW2A. Also, we described an example of the port 11 for which the physical line PL1 is connected between the aforementioned first switch SW1A and the second switch SW2A, but this is the same for other ports as well.

Figure 28:
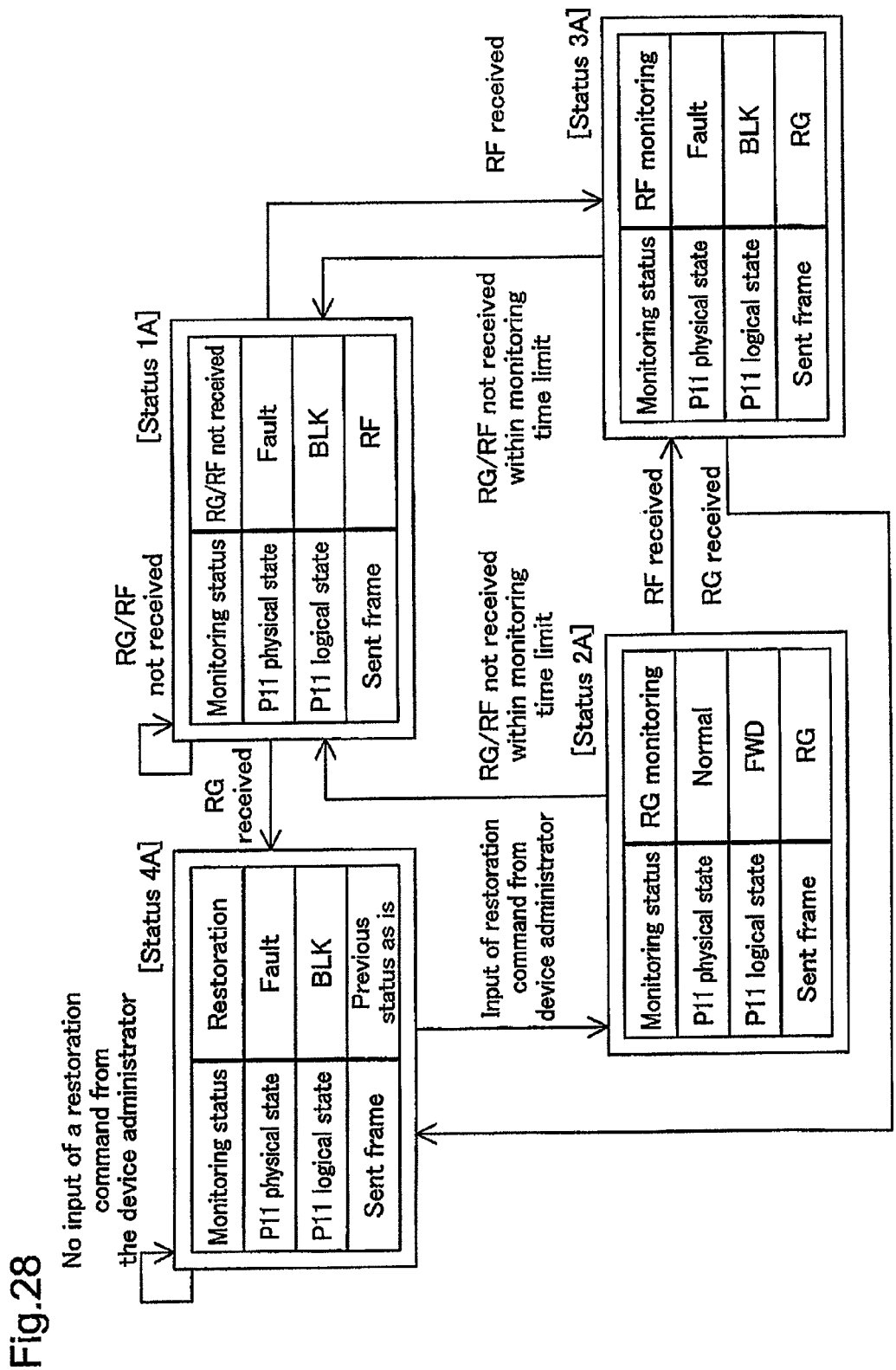
FIG. 28 shows another status transition status of the port monitoring status and the logical state by execution of the status notification frame monitoring process.

FIG. 28 shows another state of the status transition of the port monitoring status and logical state by execution of the status notification frame monitoring process. FIG. 28 also shows an example of status transition generated through the status notification frame monitoring operation executed by the status notification frame monitoring unit 470A(1) of the first switch SW1A.

When an RG frame is received at the status 1A in which the monitoring status is the "RG/RF not received", or when an RG frame is received within the monitoring time limit at the status 3A in which the monitoring status is the "RF monitoring" (or normal status), rather than the automatic restoration to the status 2A as shown in FIG. 27, the status changes to a "restoration instruction wait" status (called "status 4A") in FIG. 28. Then upon receiving a restoration instruction command from the device administrator person, the status returns to the status 2A which is the "RG monitoring" status (normal status), whereby the link between the switch SW1 and the switch SW2 is restored.

With the second embodiment noted above, the first switch SW1A sends a status notification frame at each fixed frame sending time via the first communication link L112 of the physical line PL1 that connects between the monitoring target port P11 of the first switch SW and the monitoring target port P21 of the second switch SW2A, and the second switch SW2A also sends a status notification frame at each fixed frame sending time via the second communication link L121 of the physical line PL1.

When the type of the status notification frame received within the monitoring time limit at the first switch SW is the RG frame which indicates that the link L112 from the counterpart device (first switch SW1A) to the device of interest (second switch SW2A) is normal for the second switch SW2A, the first switch SW judges that the two links L112 and L121 of the physical line PL1 are normal, and it is possible to have the first switch SW have the port P11 logical state be frame sending and receiving possible (logical state "FWD"). Meanwhile, when the type of the status notification frame received within the monitoring time limit at the first switch SW1A is the RF frame which indicates that a fault has occurred at the link L112 from the counterpart device (first switch SW1A) to the device of interest (second switch SW2A) for the second switch SW2A, the first switch SW judges that a fault has occurred at the first communication link L112 of the physical line PL1, and it is possible to have the first switch SW have the port P11 logical state be frame sending and receiving not possible (logical state "BLK"). Also, when neither the RG frame nor the RF frame is received, the first switch SW1A judges that at least the second communication link L121 of the physical line PL1 has a fault, and it is possible to have the first switch SW1A have the port P11 logical state be frame sending and receiving not possible (logical state "BLK").

Similarly, when the type of the status notification frame received within the monitoring time limit at the second switch SW2A is the RG frame which indicates that the link L121 from the counterpart device (second switch SW2A) to the device of interest (first switch SW1A) is normal for the first switch SW1A, the second switch SW2A judges that the two links L112 and L121 of the physical line PL1 are normal, and it is possible to have the second switch SW2A have the port P21 logical state be frame sending and receiving possible (logical state "FWD"). Meanwhile, when the type of the status notification frame received within the monitoring time limit at the second switch SW2A is the RF frame which indicates that a fault has occurred at the link L121 from the counterpart device (second switch SW2A) to the device of interest (first switch SW1A) for the first switch SW1A, the second switch SW2A judges that a fault has occurred at the second communication link L121 of the physical line PL1, and it is possible to have the second switch SW2A have the port P21 logical state be frame sending and receiving not possible (logical state "BLK"). Also, when neither the RG frame nor the RF frame is received, the second switch SW2A judges that at least the first communication link L112 of the physical line PL1 has a fault, and it is possible to have the second switch SW2A have the port P21 logical state be frame sending and receiving not possible (logical state "BLK").

The conventional UDLD performs analysis of the various parameters included in the received frame using software to detect the link fault, and there is the problem that the link fault detection time is considerably long.

However, with the link fault detection of the present embodiment, based on whether or not it is possible to receive within the monitoring time limit the status notification frame sent mutually from the counterpart device to the device of interest, it is possible to perform simple detection of unidirectional link fault. Note that the type of the status notification frame may be judged easily based on its frame type. Therefore, compared to the prior art, it is possible to perform link fault detection easily and in a shorter time. Because of this, it is possible to shorten the time required for switching links when a link fault has occurred.

Also, when the link fault is eliminated, the first switch SW1A and the second switch SW2A restart receiving of the RG frames within the monitoring time limit. By doing this, it is possible to automatically set the logical state of the port for which fault has occurred from the frame sending and receiving not possible (logical state "BLK") status to the frame sending and receiving possible (logical state "FWD") status, whereby the link status is automatically restored from fault status to normal status.

Note that distinguishing between the normal frame and the status notification frame is performed using the destination MAC address (dedicated MAC address allocated to the status notification frame), and the distinguishing between the RG frame and the RF frames is performed using the frame type. However, the present invention is not limited to this arrangement, and it is also possible to distinguish these by changing the destination MAC address, the layer 2 header type, or the VLAN-ID according to the frame types including the RG frame and the RF frame and the normal frame. It is also possible to make it so that the frame RG frames and the RF frames and the normal frames are distinguished using a combination of these parameters or attributes.

C. Variation Examples

Note that the present invention is not limited to the aforementioned embodiments and examples, and it is possible to implement various aspects in a scope that does not stray from the gist of the invention.

With the aforementioned embodiments, we described examples of switches as the communication devices, but the present invention may also be applied to routers.

What is claimed is:

1. A communication device for detecting faults in at least either one of a first communication link and a second communication link having a physical line connecting a first port of the communication device and a second port of a counterpart communication device, the first communication link being used for frame transfer from the communication device to the counterpart communication device, the second communication link being used for frame transfer from the counterpart communication device to the communication device, the communication device comprising:
a frame transfer unit that communicates via the first communication link and the second communication link;
a link confirmation frame sending unit that causes the frame transfer unit to send a link confirmation frame including a return identifier to determine whether it is necessary to reply and a predetermined field that indicates the link confirmation frame for use in confirming a link status via the first communication link from the communication device to the counterpart communication device;
a return link confirmation frame monitoring unit that performs fault detection of the physical line by monitoring a return link confirmation frame which is to be returned from the counterpart communication device to the communication device via the second communication link when the counterpart communication device receives the link confirmation frame via the first communication link; and
a destination determination unit that determines whether or not a received packet is a link confirmation frame based on the predetermined field of the received packet and that determines whether or not it is necessary to reply based on the return identifier of the received packet.

2. The communication device in accordance with claim 1, wherein when the return link confirmation frame is not received, the return link confirmation frame monitoring unit sets the first port at a logical state in which frame transmission is not possible, and
when the return link confirmation frame is received, the return link confirmation frame monitoring unit sets the first port at another state in which frame transmission is possible.

3. The communication device according to claim 1, wherein the predetermined field is a destination MAC address, a Layer 2 header type, a VLAN-ID, or a combination thereof.

4. A method of detecting faults in at least either one of a first communication link and a second communication link having a physical line connecting a first port of a first communication device and a second port of a second communication device, the first communication link being used for frame transfer from the first communication device to the second communication device, the second communication link being used for frame transfer from the second communication device to the first communication device, the method comprising:
sending a link confirmation frame including a return identifier to determine whether it is necessary to reply and a predetermined field that indicates the link confirmation frame for use in confirming a link status via the first communication link from the first communication device to the second communication device;
returning a return link confirmation frame via the second communication link from the second communication device to the first communication device upon receiving the link confirmation frame,
performing fault detection of the physical line by monitoring the return link confirmation frame with the first communication device,
wherein the link confirmation frame and the return link confirmation frame are distinguished from each other by a return identifier in a data field included in the link confirmation frame;
determining whether or not a received packet is a link confirmation frame based on the predetermined field of the received packet ; and
determining whether it is necessary to reply based on the return identifier of the received packet.

5. The method according to claim 4, wherein the first port is set at a logical state in which frame transmission is not possible when the return link confirmation frame is not received by the second communication device, and
wherein the first port is set at another state in which frame transmission is possible when the return link confirmation frame is received by the second communication device.

6. The method according to claim 4, wherein the predetermined field is a destination MAC address, a Layer 2 header type, a VLAN-ID, or a combination thereof.

7. The communication device according to claim 1, wherein the predetermined field is a MAC address, a Layer 2 header type, a VLAN-ID, or a combination thereof.

8. The communication device according to claim 1, further comprising:
a status notification frame monitoring unit that performs fault detection of at least the first communication link by monitoring a first status notification frame indicating a status of the first communication link which is to be sent from the counterpart communication device to the communication device via the second communication link; and
a status notification frame sending unit that causes the frame transfer unit to send a second status notification frame indicating a status of the second communication link to the counterpart communication device via the first communication link, based on the monitoring of the first status notification frame by the status notification frame monitoring unit.

9. The communication device according to claim 8, wherein the status notification frame monitoring unit:
(1) determines that there is a fault at least with the second communication link when the first status notification frame is not received, and sets the first port at a logical state in which frame transmission is not possible;
(2) determines that there is a fault in the first communication link when the first status notification frame indicates that the first communication link is faulty, and sets the first port at a logical state in which frame transmission is not possible; and
(3) determines that the first communication link is normal when the first status notification frame indicates that the first communication link is normal, and sets the first port at a logical state in which frame transmission is possible.

10. The method according to claim 4, wherein the predetermined field is a MAC address, a Layer 2 header type, a VLAN-ID, or a combination thereof.

11. The method according to claim 4, further comprising steps of:
performing fault detection of at least the first communication link by monitoring a first status notification frame indicating a status of the first communication link which is to be sent from the counterpart communication device to the communication device via the second communication link; and
sending a second status notification frame indicating a status of the second communication link to the counterpart communication device via the first communication link, based on the monitoring of the first status notification frame.

12. The method according to claim 11, wherein the step of performing fault detection includes:
(1) determining that there is a fault at least with the second communication link when the first status notification frame is not received, and setting the first port at a logical state in which frame transmission is not possible;
(2) determining that there is a fault in the first communication link when the first status notification frame indicates that the first communication link is faulty, and setting the first port at a logical state in which frame transmission is not possible; and
(3) determining that the first communication link is normal when the first status notification frame indicates that the first communication link is normal, and setting the first port at a logical state in which frame transmission is possible.

13. A communication device for detecting faults in at least either one of a first communication link and a second communication link having a physical line connecting a first port of the communication device and a second port of a counterpart communication device, the first communication link being used for frame transfer from the communication device to the counterpart communication device, the second communication link being used for frame transfer from the counterpart communication device to the communication device, the communication device comprising:
a frame transfer unit that communicates via the first communication link and the second communication link;
a status notification frame monitoring unit that performs fault detection of at least the first communication link by monitoring a first status notification frame indicating a status of the first communication link which is to be sent from the counterpart communication device to the communication device via the second communication link; and
a status notification frame sending unit that causes the frame transfer unit to send a second status notification frame indicating a status of the second communication link to the counterpart communication device via the first communication link, based on the monitoring of the first status notification frame by the status notification frame monitoring unit.

14. The communication device according to claim 13, further comprises:
a link confirmation frame sending unit that causes the frame transfer unit to send a link confirmation frame including a return identifier to determine whether it is necessary to reply and a predetermined field that indicates the link confirmation frame for use in confirming a link status via the first communication link from the communication device to the counterpart communication device;
a return link confirmation frame monitoring unit that performs fault detection of the physical line by monitoring a return link confirmation frame which is to be returned from the counterpart communication device to the communication device via the second communication link when the counterpart communication device receives the link confirmation frame via the first communication link; and
a destination determination unit that determines whether or not a received packet is a link confirmation frame based on the predetermined field of the received packet and that determines whether or not it is necessary to reply based on the return identifier of the received packet.

* * * * *